United States Patent
Lefevre et al.

(10) Patent No.: US 9,739,614 B2
(45) Date of Patent: Aug. 22, 2017

(54) FIBRE-OPTIC MEASUREMENT DEVICE, RATE GYRO, AND INERTIAL STABILISATION AND NAVIGATION UNIT

(71) Applicant: IXBLUE, Marly le Roi (FR)

(72) Inventors: Herve Lefevre, Paris (FR); Frederic Guattari, Aubervilliers (FR); Cedric Molucon, Saint Germain en Laye (FR); Eric Ducloux, Rueil Malmaison (FR); Sebastien Ferrand, Paris (FR)

(73) Assignee: IXBLUE, Saint-Germain (FR)

( * ) Notice: Subject to any disclaimer, the term of this patent is extended or adjusted under 35 U.S.C. 154(b) by 324 days.

(21) Appl. No.: 14/396,823

(22) PCT Filed: Apr. 25, 2013

(86) PCT No.: PCT/FR2013/050924
§ 371 (c)(1),
(2) Date: Oct. 24, 2014

(87) PCT Pub. No.: WO2013/160622
PCT Pub. Date: Oct. 31, 2013

(65) Prior Publication Data
US 2015/0116723 A1    Apr. 30, 2015

(30) Foreign Application Priority Data

Apr. 27, 2012 (FR) ..................... 12 53925

(51) Int. Cl.
*G01C 19/72* (2006.01)
*G01C 21/00* (2006.01)

(52) U.S. Cl.
CPC ......... *G01C 19/721* (2013.01); *G01C 19/726* (2013.01); *G01C 21/00* (2013.01)

(58) Field of Classification Search
CPC ...... G01C 19/64; G01C 19/72; G01C 19/721; G01C 19/726; G01D 5/35322
See application file for complete search history.

(56) References Cited

U.S. PATENT DOCUMENTS 5,052,808 A * 10/1991 Hilby .................. G01C 19/726
356/464
5,141,316 A * 8/1992 Lefevre ................ G01C 19/726
356/464

(Continued)

FOREIGN PATENT DOCUMENTS

EP    0 430 747 A1    6/1991
WO   2012/008955 A1   1/2012

OTHER PUBLICATIONS

International Search Report, dated Jun. 24, 2013, from corresponding PCT application.

*Primary Examiner* — Michael A Lyons
(74) *Attorney, Agent, or Firm* — Young & Thompson

(57) ABSTRACT

A fiber-optic measurement device (10) includes a SAGNAC ring interferometer (20) having a proper frequency $f_p$, a detector (14) and a modulation chain (30) generating a phase-shift modulation $\phi_m(t)$ between the two counter-propagating waves (24, 25) propagating in the ring interferometer. The device aims to reduce measurement faults due to the linearity defects in the modulation chain of such a measurement device with optical fiber. For this reason, the fiber-optic measurement device reduces the amplitude of the phase-shift modulation $\phi_m(t)$ which is the sum of a first biasing phase-shift modulation component $\phi_{b1}(t)$ and a first counter-reaction phase-shift modulation component $\phi_{cr1}(t)$, the phase-shift modulation $\phi_m(t)$ falling or rising by twice the amplitude of the first biasing phase-shift modulation component $\phi_{b1}(t)$. A rate gyro including such a measurement (Continued)

device and an inertial stabilization or navigation unit including at least one such rate gyro are also described.

12 Claims, 18 Drawing Sheets

(56) References Cited

U.S. PATENT DOCUMENTS

| | | | | |
|---|---|---|---|---|
| 5,196,904 A | * | 3/1993 | Dane | G01C 19/72 |
| | | | | 356/464 |
| 5,283,626 A | * | 2/1994 | Cox | G01C 19/72 |
| | | | | 356/464 |
| 5,363,195 A | * | 11/1994 | Ward | G01C 19/726 |
| | | | | 332/145 |
| 5,719,674 A | * | 2/1998 | Martin | G01C 19/728 |
| | | | | 356/462 |

* cited by examiner

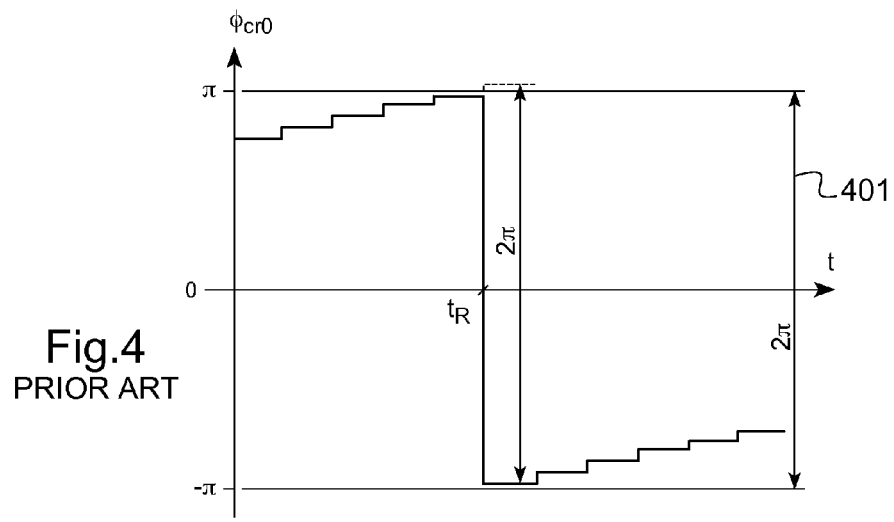
Fig.4 PRIOR ART
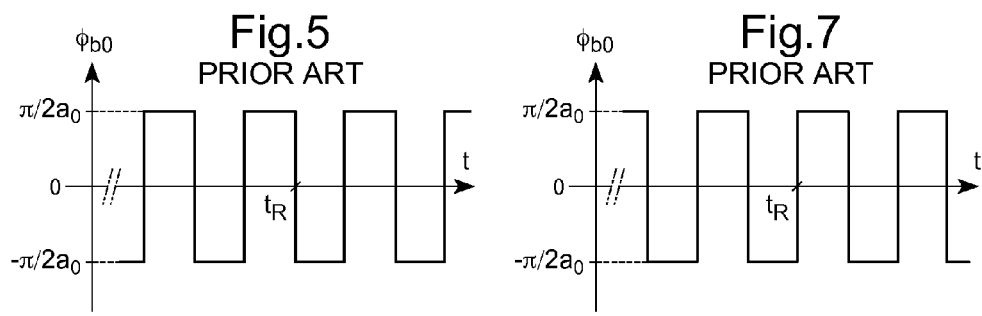
Fig.5 PRIOR ART
Fig.7 PRIOR ART
Fig.6 PRIOR ART
Fig.8 PRIOR ART
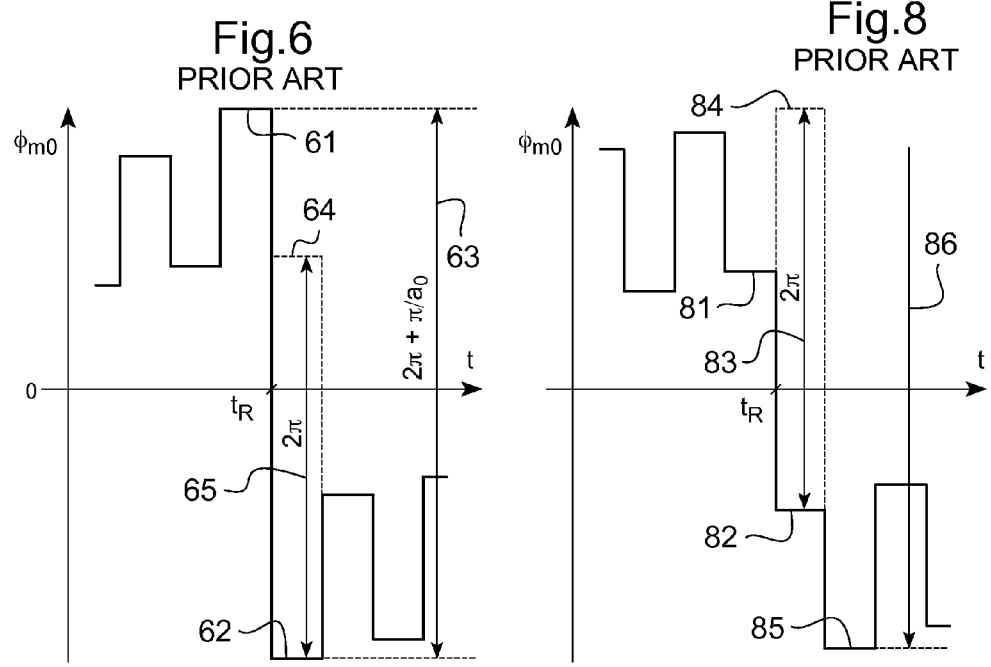

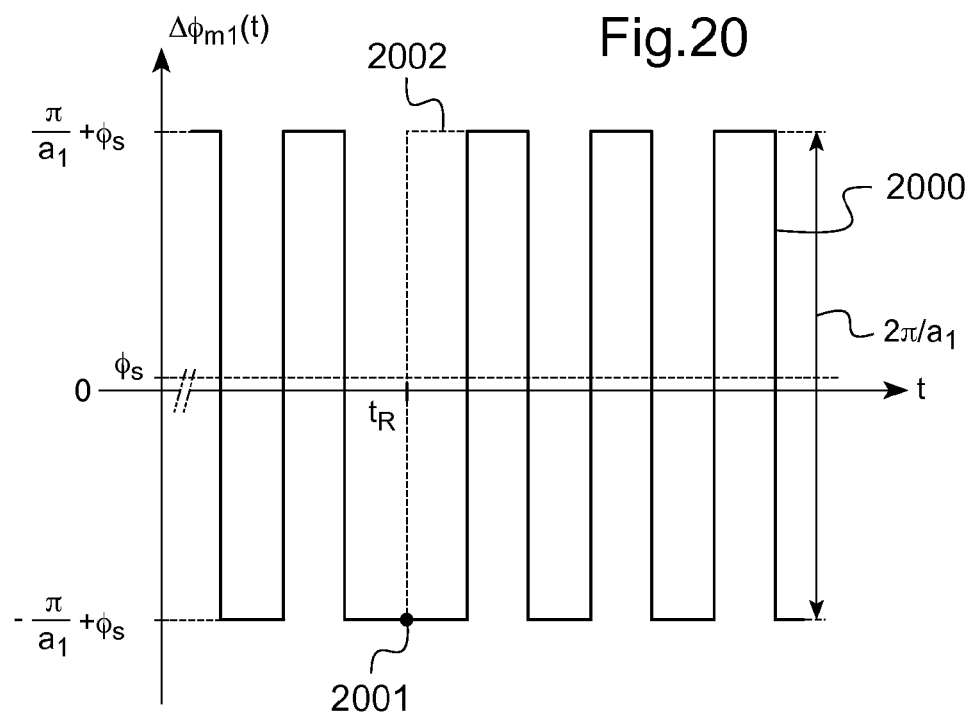
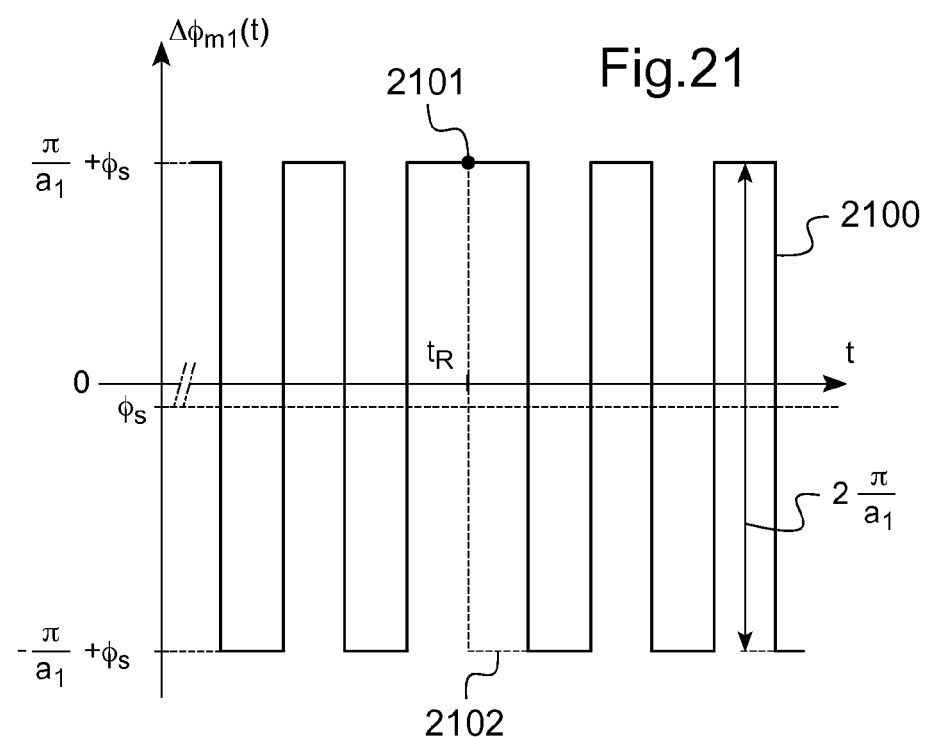

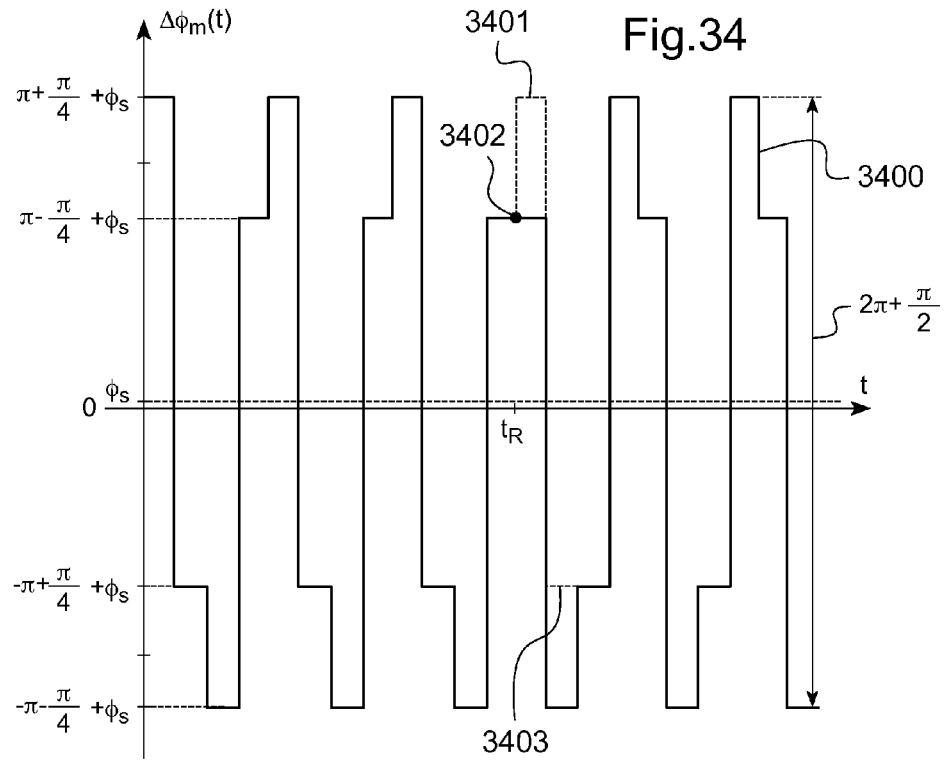
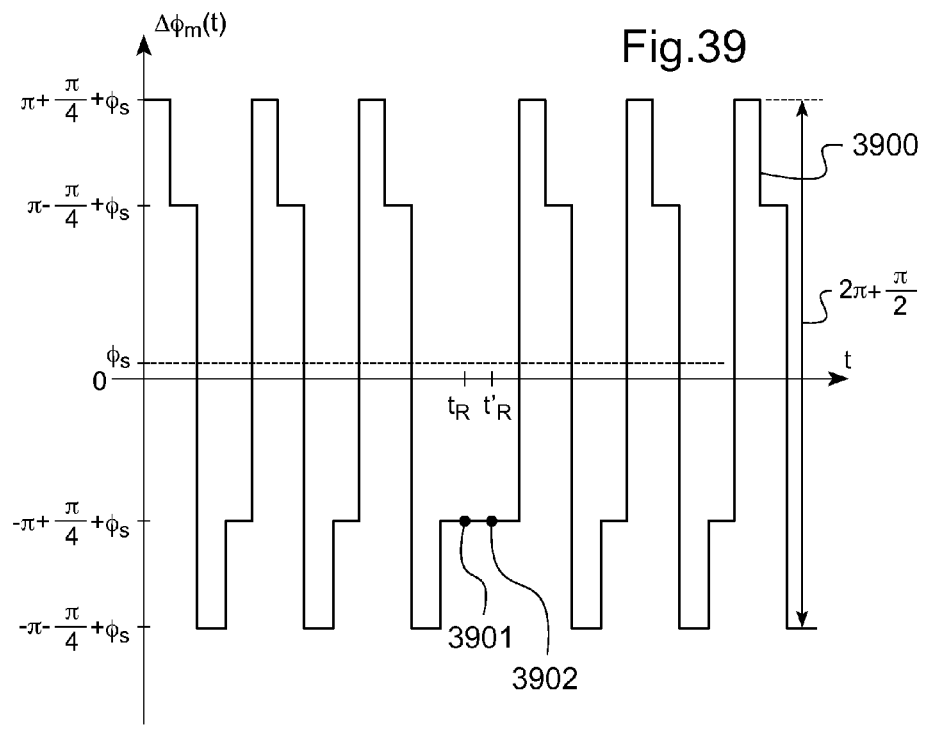

FIBRE-OPTIC MEASUREMENT DEVICE, RATE GYRO, AND INERTIAL STABILISATION AND NAVIGATION UNIT

BACKGROUND OF THE INVENTION

The invention relates to a fiber-optic measurement device allowing to measure the variation of a parameter that produces non-reciprocal disturbances in a SAGNAC ring interferometer.

DESCRIPTION OF THE RELATED ART

The SAGNAC interferometer and the physical phenomena involved thereby are well known. Reference may be made for example about that to "*The Fiber-Optic Gyroscope*", H. Lefèvre (Artech House, 1993).

In such an interferometer, a splitting plate or any other splitting device splits an incident wave at the input of the interferometer into two waves. The two thus-created waves are referred to as "counter-propagating waves". They indeed propagate in opposite directions along a same closed optical path, then recombine with each other, producing interferences. The interference state between the two counter-propagating waves then depends on the relative phase difference between them. The luminous power P measured at the output of a SAGNAC interferometer is of the form: $P(\Delta\phi) = P_0[1+\cos(\Delta\phi)]$, where $\Delta\phi$ is the relative phase difference between the two counter-propagating waves. Hence, the power measured at the output of the interferometer takes values between a minimum (it is then talked about "dark" fringe) and a maximum ("bright" fringe) as a function the value of the phase difference $\Delta\phi$.

It is known that some physical phenomena are liable to introduce so-called non-reciprocal phase shifts in the counter-propagating waves, hence generating a phase difference $\Delta\phi_p$ between these waves and modifying the interference state during the recombination thereof. Hence, the measurement of this non-reciprocal phase difference $\Delta\phi_p$ allows to quantify the phenomenon that has been generated thereby.

The main physical phenomenon liable to create non-reciprocal disturbances is the SAGNAC effect produced by the rotation of the interferometer about an axis perpendicular to the plane of its closed optical path. A second effect, the FARADAY effect or collinear magneto-optic effect, is also known for producing non-reciprocal effects of this type.

It is known that a SAGNAC interferometer can include a fiber-optic coil, which is preferably single-mode and of the polarization-maintaining type. The multiple turns of an optical fiber form a closed optical path of very long length, up to several kilometers.

A proper frequency $f_p$ of the SAGNAC interferometer is commonly defined. The proper frequency $f_p$ of a SAGNAC ring interferometer including a single-mode fiber-optic coil (silica fiber having a refractive index close to 1.5 in the operating wavelength range) of 1 kilometer long is of the order of 100 kilohertz (kHz). The extension of the coil length and hence of the optical path has for advantage to provide the interferometer with a greater sensitivity.

As explained hereinabove, the signal measured at the output of the interferometer is a cosine function of the phase difference $\Delta\phi$ between the two counter-propagating waves, so that the sensitivity of the response $P(\Delta\phi)$ of the interferometer near the zero phase difference ($\Delta\phi=0$) is low.

It is known that it is possible to displace the operating point of the interferometer towards a point offering a greater sensitivity. It has notably been proposed to introduce an additional so-called "biasing" phase-difference modulation, by means of a phase modulator placed in the SAGNAC ring interferometer.

A simple-to-implement solution to perform this biasing is shown in FIG. 2. It consists in a square pulse-wave periodic modulation $\phi_{b0}$, at a biasing modulation frequency $f_b$, having levels $+\pi/2a_0$ and $-\pi/2a_0$ ($a_0$ being a non-zero real number). This biasing phase-shift modulation $\phi_{b0}$ introduces between the two counter-propagating waves a biasing phase-difference modulation $\Delta\phi_{b0}$, which is also a pulse-wave modulation, at a biasing modulation frequency $f_b$, with levels $+\pi/a_0$ and $-\pi/a_0$.

By choosing for example $a_0=2$, the response provided by the SAGNAC interferometer may be exploited with a very high sensitivity.

It is also known that the measurement accuracy is improved by the use of a so-called "phase cancellation" method, also called closed-loop operation, instead of a simple open-loop operation.

According to this method, an additional so-called "feedback" phase shift $\phi_{cr0}$ is generated by means of the phase modulator between the two counter-propagating waves. This additional phase shift then introduces between the two counter-propagating waves a feedback phase difference $\Delta\phi_{cr0}$.

This additional phase difference $\Delta\phi_{cr0}$ then compensate for the phase difference $\Delta\phi_p$ produced by the measured parameter. The sum of the two phase differences $\Delta\phi_p$ and $\Delta\phi_{cr}$ may then be kept at zero, which allows to make the interferometer operating with a better accuracy.

The measurement of the parameter to be measured is performed by using the signal required for the production of the feedback phase shift $\phi_{cr0}$.

The phase-cancellation method may be implemented thanks to a serrodyne modulation technique in which the feedback phase shift $\phi_{cr0}$ is a stair-step modulation, as shown in FIG. 1.

Each step has herein a width (or duration) $\Delta\tau_g = \frac{1}{2} f_p$. Moreover, the height of each step is such that the phase-difference modulation $\Delta\phi_{cr0}$ introduced between the two counter-propagating waves compensate at each instant for the phase difference $\Delta\phi_p$ due to the measured parameter. As a function of the value, whether it is positive or negative, of this phase difference $\Delta\phi_p$, the feedback phase-shift modulation $\phi_{cr0}$ is either an ascending ramp (case of FIG. 1) or a descending ramp.

By combining the two above-exposed methods, i.e., on the one hand the biasing method, and on the other hand, the phase-cancellation method, it is then obtained a phase-shift modulation $\phi_{m0}$ that is the sum of the biasing phase-shift modulation $\phi_{b0}$ and of the feedback phase-shift modulation $\phi_{cr0}$. The result obtained is shown in FIG. 3, in which it can be observed that the phase-shift modulation $\phi_{m0}$ is an ascending pulse-wave modulation.

Moreover, it is known to make the feedback phase-shift modulation $\phi_{cr0}$ fall down. To limit the measurement errors, this falling down has for amplitude $2\pi$ as shown in FIG. 4. The falling down occurs when a step of the ramp is such that its level exceeds $\pi$, herein at the instant $t=t_R$.

This falling down to $2\pi$ is made necessary by the fact that the value of the voltage applied to the phase modulator to produce the feedback phase shift $\phi_{cr0}$ cannot increase indefinitely.

Hence generated, the feedback phase-shift modulation $\phi_{cr0}$ has a maximum amplitude 401 lower than $2\pi$.

The falling down to $2\pi$ of the feedback phase-shift modulation $\phi_{cr0}$ occurring at the instant $t=t_R$, it follows that the phase-shift modulation $\phi_{m0}$ has two different profiles according to whether this falling down occurs during the passage of from a high level to a low level, or during the passage from a low level to a high level of the biasing phase-shift modulation $\phi_{b0}$.

Hence, in FIG. 6, it has be shown the case that will be called hereinafter the "wall" case, in which the phase-shift modulation $\phi_{m0}$ is the sum of the feedback phase-shift modulation $\phi_{cr0}$ of FIG. 4 and of the biasing phase-shift modulation $\phi_{b0}$ of FIG. 5, the latter passing from its high level $+\pi/2a_0$ to its low level $-\pi/2a_0$ at the instant $t=t_R$.

It is then observed in FIG. 6 that the phase-shift modulation $\phi_{m0}$ falls down from a first level 61 to a second level 62, at the instant $t=t_R$, the amplitude 63 between these two extreme levels being substantially equal to $2\pi+\pi/a_0$.

Indeed, without the falling down of the ramp, the phase-shift modulation $\phi_{m0}$ would have passed, at the instant $t=t_R$, from the first level 61 to the intermediate level 64 shown in dash line. Nevertheless, with the ramp falling down, the phase-shift modulation $\phi_{m0}$ sees the intermediate level 64 passing to the second level 62, the amplitude 65 between these two levels 62, 64 being equal to the amplitude of the ramp falling down, i.e $2\pi$.

Likewise, in FIG. 8, it has been shown the case that will be called hereinafter the "stair" case, in which the phase-shift modulation $\phi_{m0}$ is the sum of the feedback phase-shift modulation $\phi_{cr0}$ of FIG. 4 and of the biasing phase-shift modulation $\phi_{b0}$ of FIG. 7, the latter passing from its low level $-\pi/2a_0$ to its high level $+\pi/2a_0$ at the instant $t=t_R$.

It can be observed in FIG. 8 that, without the ramp falling down, the phase-shift modulation $\phi_{m0}$ should have passed, at the instant $t=t_R$, from a first level 81 to a high level 84 shown in dash line. However, with the ramp falling down, the phase-shift modulation $\phi_{m0}$ sees the high level 84 passing to the second level 82, the amplitude 83 between these two levels 82, 84 being equal to the amplitude of the ramp falling down, i.e $2\pi$.

Afterwards, during the transition of the biasing phase-shift modulation $\phi_{b0}$ from its high level to its lower level, the phase-shift modulation $\phi_{m0}$ passes from the second level 82 to a low level 85, located about $\pi/a_0$ lower.

Hence, the total amplitude 86 of the phase-shift modulation $\phi_{m0}$ is also substantially equal to $2\pi+\pi/a_0$.

The "wall" and "stair" cases of FIGS. 6 and 8 relates to so-called "2-state" modulations (i.e. the two levels of the biasing modulation).

FIGS. 9 to 12 relates to so-called "4-state" modulations, such as those taught by the document EP0430747, for which the biasing phase-shift modulation $\phi_{b0}$ is such that, at each period of modulation, it is equal to:
 $\phi_1$ during the first quarter of period,
 $\alpha\phi_1$ during the second quarter of period,
 $-\phi_2$ during the third quarter of period, and
 $-\alpha\phi_2$ during the fourth quarter of period.

The values of $\alpha$, $\phi_1$ and $\phi_2$ are chosen so that they satisfy the relation: $\cos(\phi_1+\phi_2)=\cos[\alpha(\phi_1+\phi_2)]$.

According to the proposition of the document EP0430747, two examples of biasing phase-shift modulation $\phi_{b0}$ have been shown in FIGS. 9 to 11, for which $\alpha=9/7$ and $\phi_1=\phi_2=7\pi/16$.

The biasing phase-shift modulation $\phi_{b0}$ (4-state modulation) then takes sequentially four different values hence defining four modulation states:
 two high states for which $\phi_{b0}=\phi_1=7\pi/16$ and $\phi_{b0}=\alpha\phi_1=9\pi/16$, and
 two low states for which $\phi_{b0}=\phi_2=-7\pi/16$ and $\phi_{b0}=-\alpha\phi_2=-9\pi/16$.

The amplitude of this modulation between the extreme high and low levels is hence of $18\pi/16$, i.e. an amplitude slightly higher than $\pi$.

Hence, using a biasing phase-shift modulation $\phi_{b0}$ as taught by the document EP0430747, a phase-shift modulation $\phi_{m0}$ as shown in FIGS. 10 and 12 is obtained.

FIG. 10 corresponds to a "stair" case, the biasing phase-shift modulation $\phi_{b0}$ associated with FIG. 9 passing from one of the two low levels to one of the two high levels at the instant $t=t_R$ of the ramp falling down.

Likewise, FIG. 12 corresponds to a "wall" case, the biasing phase-shift modulation $\phi_{b0}$ associated with FIG. 11 operating a transition from one of the two high levels to one of the two low levels at the instant $t=t_R$ of the ramp falling down.

Hence, in the two above-mentioned cases, the phase-shift modulation $\phi_{m0}$ proposed by the document EP0430747 has hence a total amplitude substantially equal to $2\pi+18\pi/16$, i.e. a value higher than $3\pi$.

To reach such a high amplitude, the voltage excursion (volts) on the phase modulator has to be high, so that the non-linearities of the modulation chain limit the accuracy of the parameter measurement.

SUMMARY OF THE INVENTION

So as to remedy the above-mentioned drawback, the object of the present invention is to propose a fibre-optic measurement device in which a parameter to be measured generates a phase difference between two counter-propagating waves in which the cumbersome effects of the non-linearities of the modulation chain are reduced.

For that purpose, the invention relates to a fibre-optic measurement device of the type in which a parameter to be measured generates a phase difference $\Delta\phi_p$ between two counter-propagating waves, including:
 a light source,
 a fiber-optic SAGNAC ring interferometer, preferably single-mode, including a coil and a splitting element, in which said two counter-propagating waves propagate, said ring interferometer having a proper frequency $f_p$,
 an electromagnetic radiation detector, receiving the luminous power exiting from said ring interferometer and delivering a modulated electrical signal representative of the luminous power, which is function of the total phase difference $\Delta\phi_t$ between said two counter-propagating waves at the output of said ring interferometer,
 a modulation chain adapted to modulate said luminous power exiting from said ring interferometer, said modulation chain including at least one phase modulator placed in said ring interferometer and adapted to generate at the output of said modulation chain a phase-shift modulation $\phi_m(t)$, introducing between said two counter-propagating waves a phase-difference modulation $\Delta\phi_m(t)$ such that: $\Delta\phi_m(t)=\phi_m(t)-\phi_m(t-\Delta\tau_g)$, $\Delta\tau_g=1/(2\,f_p)$ being the transit time difference between said two counter-propagating waves determined between said phase modulator and said splitting element, and
 signal processing means including:
  an analog/digital converter digitizing said modulated electrical signal received from the detector and representative of said luminous power received by said detector to deliver a digital electrical signal, and a digital processing unit adapted to process said digital electrical signal to deliver a signal function of said phase difference $\Delta\phi_p$ and of said parameter to be measured, biasing means adapted to generate a first biasing signal producing at the output of the modulation chain a first, square pulse-wave, biasing phase-shift modulation component $\phi_{b1}(t)$ of amplitude $\pi/a_1$, $a_1$ being a non-zero real number, periodic at a first biasing modulation frequency $f_{b1}$ such that $f_{b1}=(2k_1+1)f_p$, $k_1$ being a natural number and $f_p$ being the proper frequency, feedback means adapted to process said signal function of said phase difference $\Delta\phi_p$ to generate a first feedback signal, producing at the output of the modulation chain a first, stair-step, feedback phase-shift modulation component $\phi_{cr1}(t)$, each step having a duration $\Delta\tau_g/(2k_1+1)$, said first feedback phase-shift modulation component $\phi_{cr1}(t)$ introducing between said two counter-propagation waves a first feedback phase-difference modulation component $\Delta\phi_{cr1}(t)=\phi_{cr1}(t)-\phi_{cr1}(t-\Delta\tau_g)$ that is function of said phase difference $\Delta\phi_p$, means for controlling said modulation chain, adapted to process said first biasing signal and said first feedback signal to deliver at least one first control signal at the input of said modulation chain, producing at the output of the modulation chain a first phase-shift modulation component $\phi_{m1}(t)$ that is the phase sum of said first biasing phase-shift modulation component $\phi_{b1}(t)$ and of said first feedback phase-shift modulation component $\phi_{cr1}(t)$, such that $\phi_{m1}(t)=\phi_{b1}(t)+\phi_{cr1}(t)$, said fibre-optic measurement device being characterized in that the means for controlling said modulation chain are arranged so that said first phase-shift modulation component $\phi_{m1}(t)$ operates a transition of twice the amplitude of the first biasing phase-shift modulation component $\phi_{b1}(t)$, i.e. $2\pi/a_1$, when its level exceeds the amplitude of the first biasing phase-shift modulation component $\phi_{b1}(t)$, i.e. $\pi/a_1$.

It will be understood herein that a transition of the first phase-shift modulation component $\phi_{m1}(t)$ corresponds to a change of its level, wherein such transition can be made:

either downwards when the first feedback phase-shift modulation component $\phi_{cr1}(t)$ is an ascending stair-step modulation, such that the first feedback phase-difference modulation component $\Delta\phi_{cr1}(t)$ is positive when the phase difference $\Delta\phi_p$ due to the parameter to be measured is negative, or upwards when the first feedback phase-shift modulation component $\phi_{cr1}(t)$ is an descending stair-step modulation, such that the first feedback phase-difference modulation component $\Delta\phi_{cr1}(t)$ is negative when the phase difference $\Delta\phi_p$ due to the parameter to be measured is positive.

In the case of a downward transition of the first phase-shift modulation component $\phi_{m1}(t)$, it will hereinafter be talked about falling down of this modulation. In the case of an upward transition of the first phase-shift modulation component $\phi_{m1}(t)$, it will then be talked about rising up of this modulation.

Hence, said fibre-optic measurement device according to the invention allows to reduce the amplitude of the phase-shift modulation $\phi_m(t)$ thanks to the summing between the first biasing phase-shift modulation component $\phi_{b1}(t)$ and the feedback phase-shift modulation $\phi_{cr}(t)$ and to the transition operated by the modulation resulting from this sum.

Indeed, according to the invention, this amplitude is always lower than $2\pi/a_1$, so that the excursion range used on the modulation chain is reduced. This hence limits the effects of the non-linearities of the modulation chain on the phase-shift modulation $\phi_m$, the latter having herein only one component $\phi_{m1}$.

Moreover, using a centred phase-shift modulation $\phi_{m1}(t)$, the defects appearing at the falling down or the rising up of the modulation due to the non-linearities of the modulation chain are eliminated. This allows in particular to control more easily the transfer function of the modulation chain.

Besides, other advantageous and non-limitative characteristics of the device according to the invention are as follows:

said first feedback phase-shift modulation component $\phi_{cr1}(t)$ has stair steps of height $-\Delta\phi_p/(2k_1+1)$, such that said first feedback phase-difference modulation component $\Delta\phi_{cr1}(t)$ is such that $\Delta\phi_{cr1}(t)=-\Delta\phi_p$, to compensate for said phase difference $\Delta\phi_p$ due to the parameter to be measured;

said biasing means are adapted to generate a second biasing signal producing at the output of the modulation chain a second component of biasing phase-shift modulation $\phi_{b2}(t)$, said second biasing phase-shift modulation component $\phi_{b2}(t)$ being:

a square pulse-wave modulation of amplitude $\pi/a_2$, $a_2$ being a non-zero real number different from $a_1$, periodic at a second biasing modulation frequency $f_{b2}$ such that $f_{b2}=(2k_2+1)f_p$, $k_2$ being a natural number such that $(2k_1+1)$ and $(2k_2+1)$ are multiples of each other, and $f_p$ being the proper frequency, in quadrature relative to the first biasing phase-shift modulation component $\phi_{b1}(t)$;

$a_1=1$;

$a_2=1$;

said fibre-optic measurement device also comprises means for controlling the gain of said modulation chain allowing to keep adjusted the transfer function of said modulation chain;

it is provided that:

$a_1=1$, said first feedback phase-shift modulation component $\phi_{cr1}(t)$ has stair steps of height $[a_2/(a_2-1)][-\Delta\phi_p/(2k_1+1)]$, $a_2$ being a real number strictly higher than $a_1=1$, said biasing means are adapted to generate a second biasing signal producing at the output of the modulation chain a second biasing phase-shift modulation component $\phi_{b2}(t)$, said second biasing phase-shift modulation component $\phi_{b2}(t)$ being:

a square pulse-wave modulation of amplitude $\pi/a_2$, periodic at a second biasing modulation frequency $f_{b2}$ such that $f_{b2}=f_{b1}=(2k_1+1)f_p$, $f_{b1}$ being the first biasing modulation frequency and $f_p$ being the proper frequency, and in lagging quadrature relative to the first biasing phase-shift modulation component $\phi_{b1}(t)$, said feedback means are adapted to generate a second feedback signal, producing at the output of the modulation chain a second feedback phase-shift modulation component $\phi_{cr2}(t)$, said second feedback phase-shift modulation component $\phi_{cr2}(t)$ being:

a stair-step modulation, each step having a duration $\Delta\tau_g/(2k_1+1)$ and a height $[1/(a_2-1)][-\Delta\phi_p/(2k_1+1)]$, in lagging quadrature relative to the first feedback phase-shift modulation component $\phi_{cr1}(t)$, and said second feedback phase-shift modulation component $\phi_{cr2}(t)$ introducing a second feedback phase-difference modulation component $\Delta\phi_{cr2}(t)$ =φ$_{cr2}$(t)−φ$_{cr2}$(t−Δτ$_g$) between said two counter-propagating waves, such that the difference between the first feedback phase-difference modulation component Δφ$_{cr1}$(t) and the second feedback phase-difference modulation component Δφ$_{cr2}$(t) compensates for the phase difference Δφ$_p$, i.e. Δφ$_{cr1}$(t)−Δφ$_{cr2}$(t)=−Δφ$_p$, said means for controlling said modulation chain are adapted to process said second biasing signal and said second feedback signal to deliver at least one second control signal at the input of said modulation chain, producing at the output of the modulation chain a second phase-shift modulation component φ$_{m2}$(t) that is the sum of said second biasing phase-shift modulation component φ$_{b2}$(t) and said second feedback phase-shift modulation component φ$_{cr2}$(t), so that φ$_{m2}$(t)=φ$_{b2}$(t)+φ$_{cr2}$(t), and the control means are arranged so that said second phase-shift modulation component φ$_{m2}$(t) operates a transition of twice the amplitude of the second biasing phase-shift modulation component φ$_{b2}$(t), i.e. 2π/a$_2$, when its level exceeds the amplitude of the second biasing phase-shift modulation component φ$_{b2}$(t), i.e. π/a$_2$, the phase-shift modulation φ$_m$(t) being equal to the difference between the first phase-shift modulation component φ$_{m1}$(t) and the second phase-shift modulation component φ$_{m2}$(t), so that φ$_m$(t)=φ$_{m1}$(t)−φ$_{m2}$(t), k$_2$=0, and
k$_1$=0.

The measurement device according to the invention is particularly well adapted to the realization of a gyrometer. In this case, the parameter to be measured is a component of the rotational speed of the ring interferometer.

Hence, the invention also relates to a gyrometer, characterized in that it is compliant with the fiber-optical measurement device according to the invention, the parameter to be measured being a component of the rotational speed of the ring interferometer.

This gyrometer advantageously enters into the making of navigation or inertial-stabilization systems.

Hence, the invention also proposes a navigation or inertial-stabilization system including at least one gyrometer according to the invention.

BRIEF DESCRIPTION OF THE DRAWING FIGURES

Embodiments of the invention will be described in detail with reference to the drawings in which:

FIG. 4 shows an ascending stair-step feedback phase-shift modulation φ$_{cr0}$ according to the prior art, which falls down by 2π at the instant t=t$_R$;

FIG. 5 shows a pulse-wave biasing phase-shift modulation φ$_{b0}$ according to the prior art, which passes from a high level to a low level at the instant t=t$_R$;

FIG. 6 shows a phase-shift modulation φ$_{m0}$ according to the prior-art, which is the sum of the feedback phase-shift modulation φ$_{cr0}$ of FIG. 4 and of the biasing phase-shift modulation φ$_{b0}$ of FIG. 5;

FIG. 7 shows a pulse-wave biasing phase-shift modulation φ$_{b0}$ according to the prior art, which passes from a low level to a high level at the instant t=t$_R$;

FIG. 8 shows a phase-shift modulation φ$_{m0}$ according to the prior art, which is the sum of the feedback phase-shift modulation φ$_{cr0}$ of FIG. 4 and of the biasing phase-shift modulation φ$_{b0}$ of FIG. 7;

FIG. 20 shows the first phase-difference modulation component Δφ$_{m1}$(t) corresponding to the first phase-shift modulation component φ$_{m1}$(t) of FIG. 17;

FIG. 21 shows the first phase-difference modulation component Δφ$_{m1}$(t) corresponding to the first phase-shift modulation component φ$_{m1}$(t) of FIG. 19;

Figure 29:
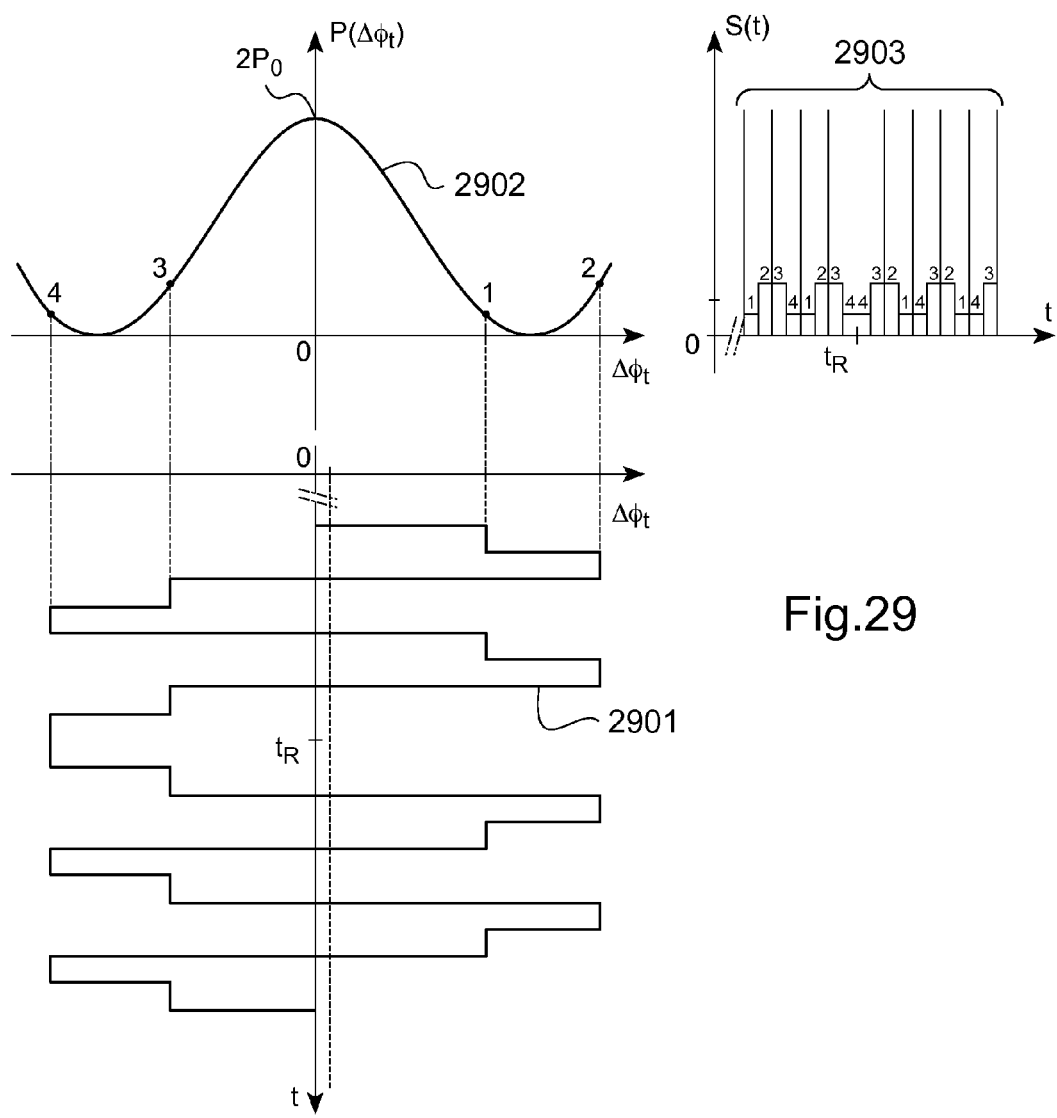
Figure 30:
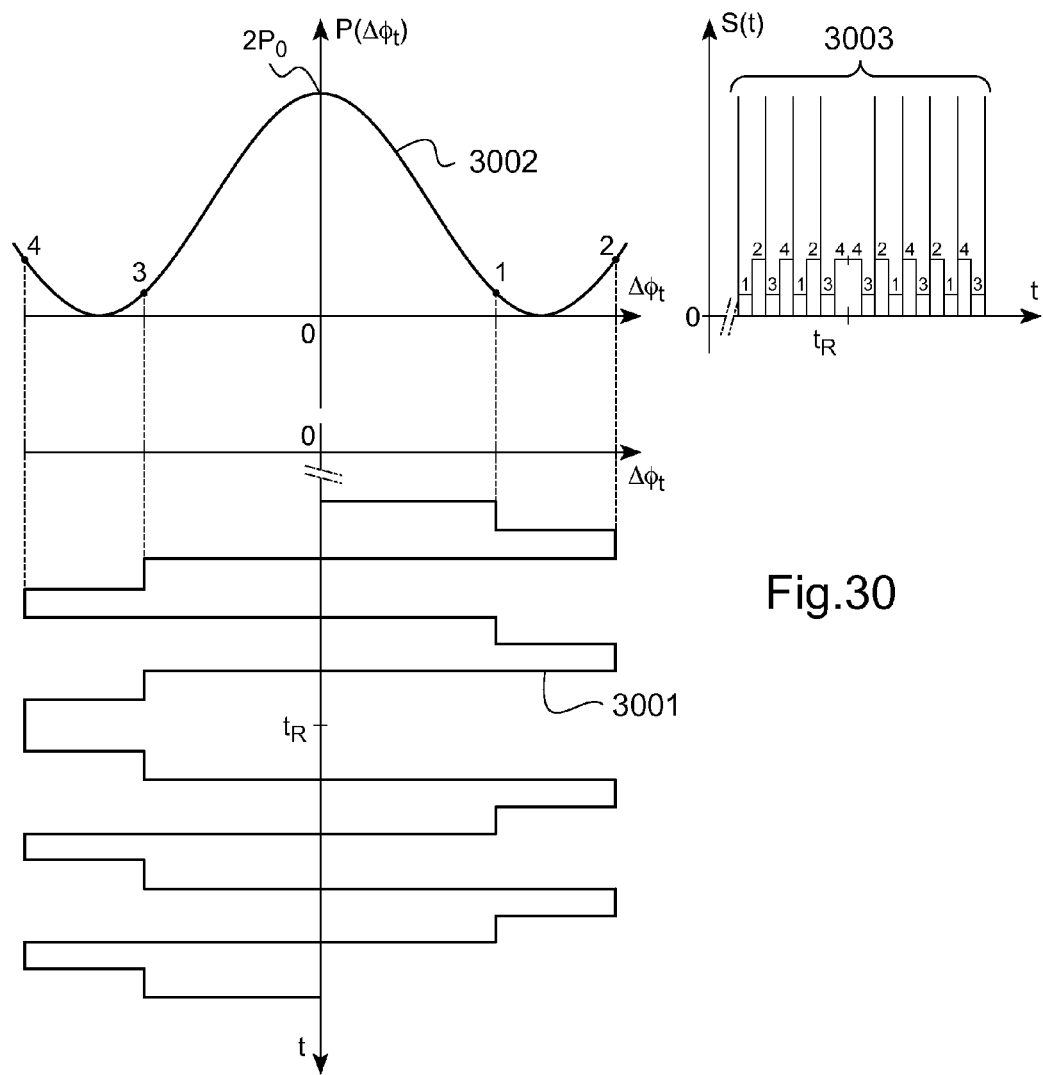
Figure 31:
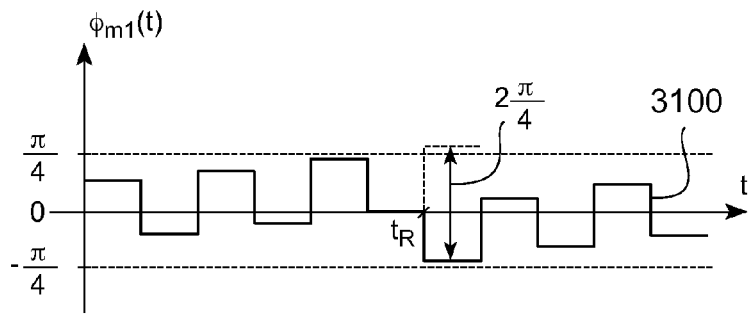
Figure 32:
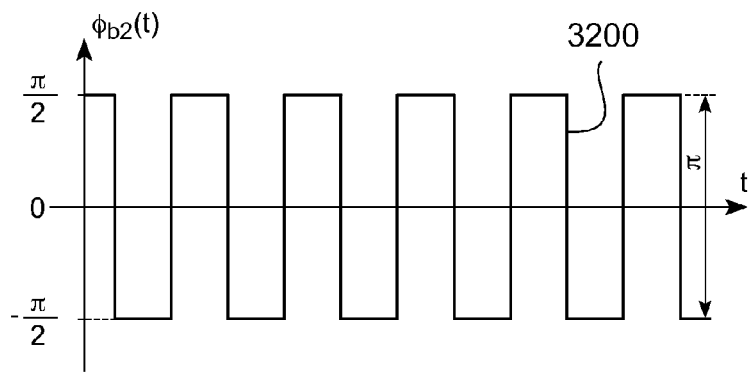
Figure 33:
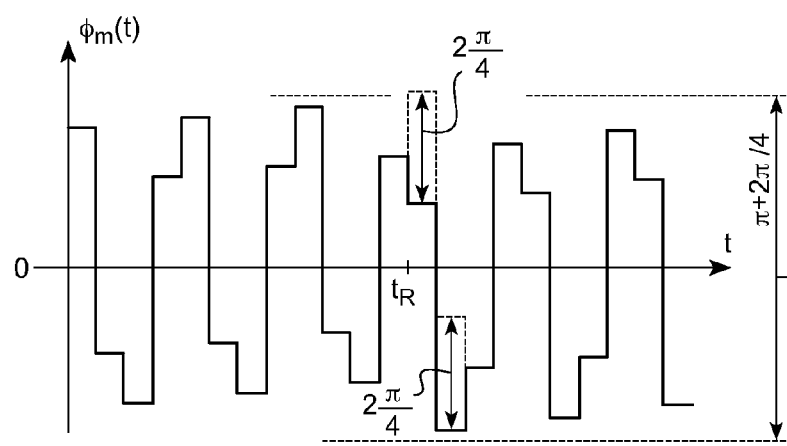
Figure 35:
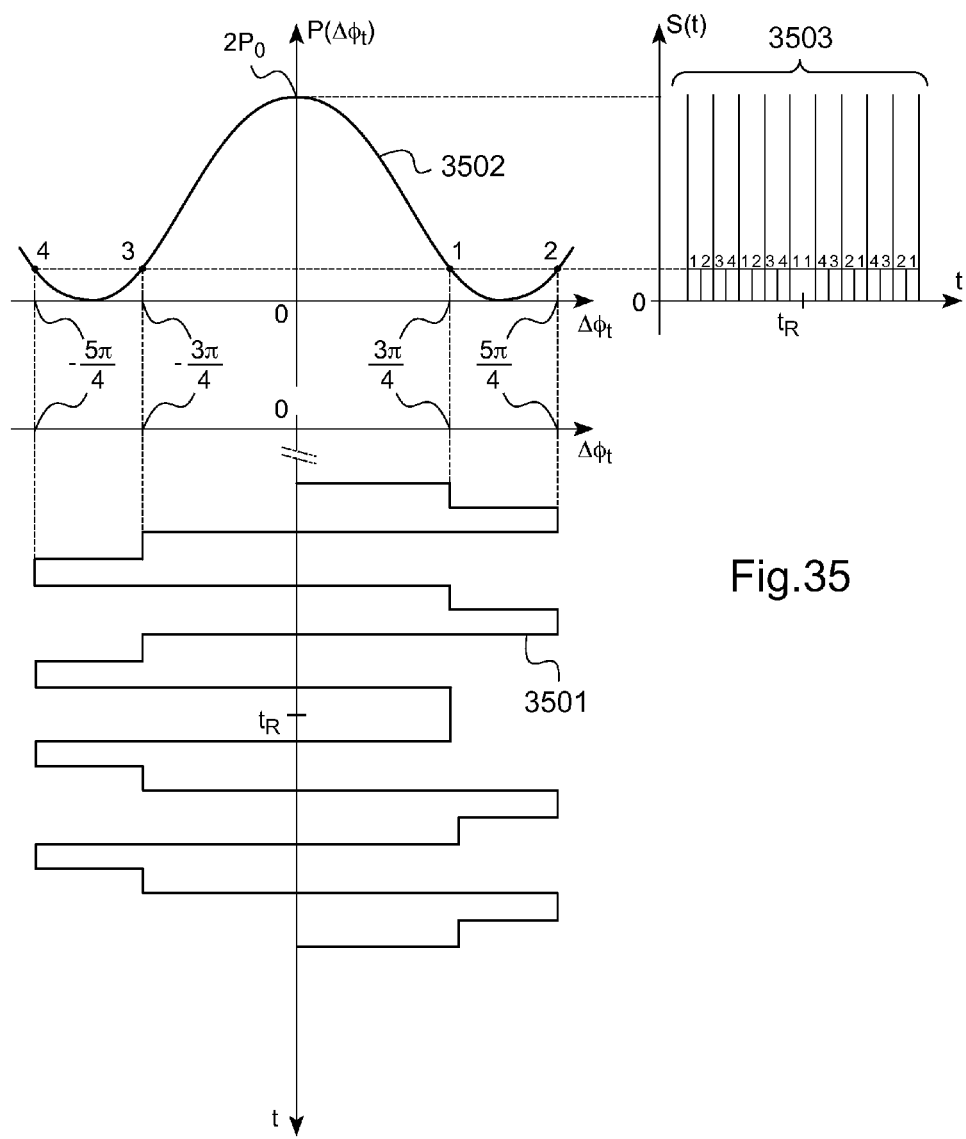
Figure 36:
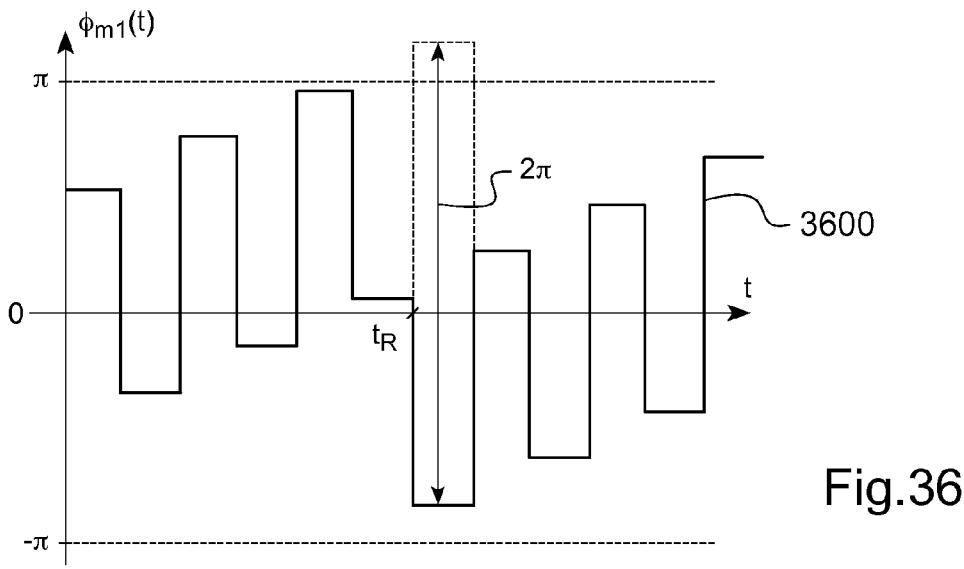
Figure 37:
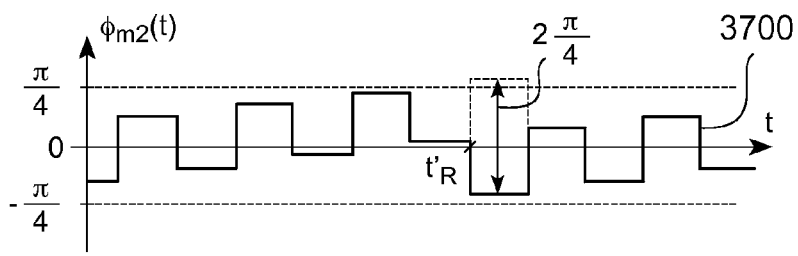
Figure 38:
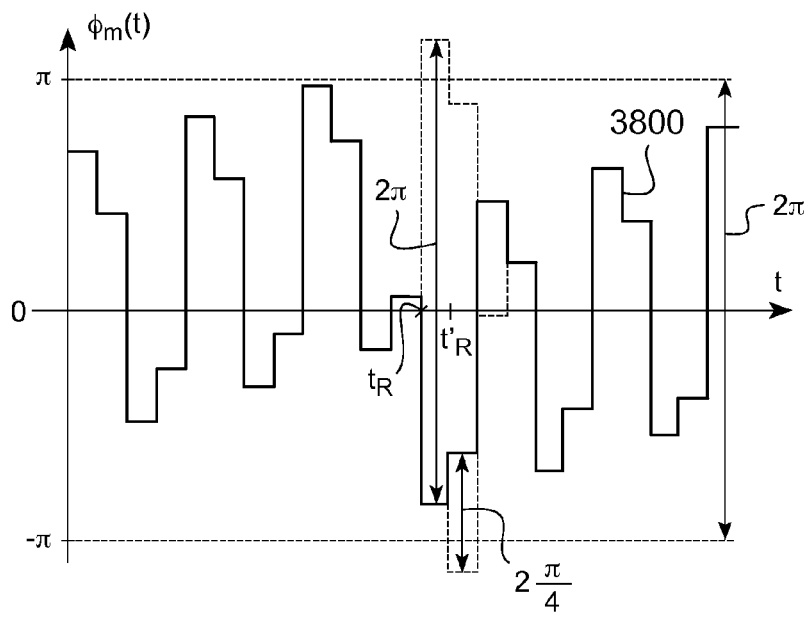
Figure 40:
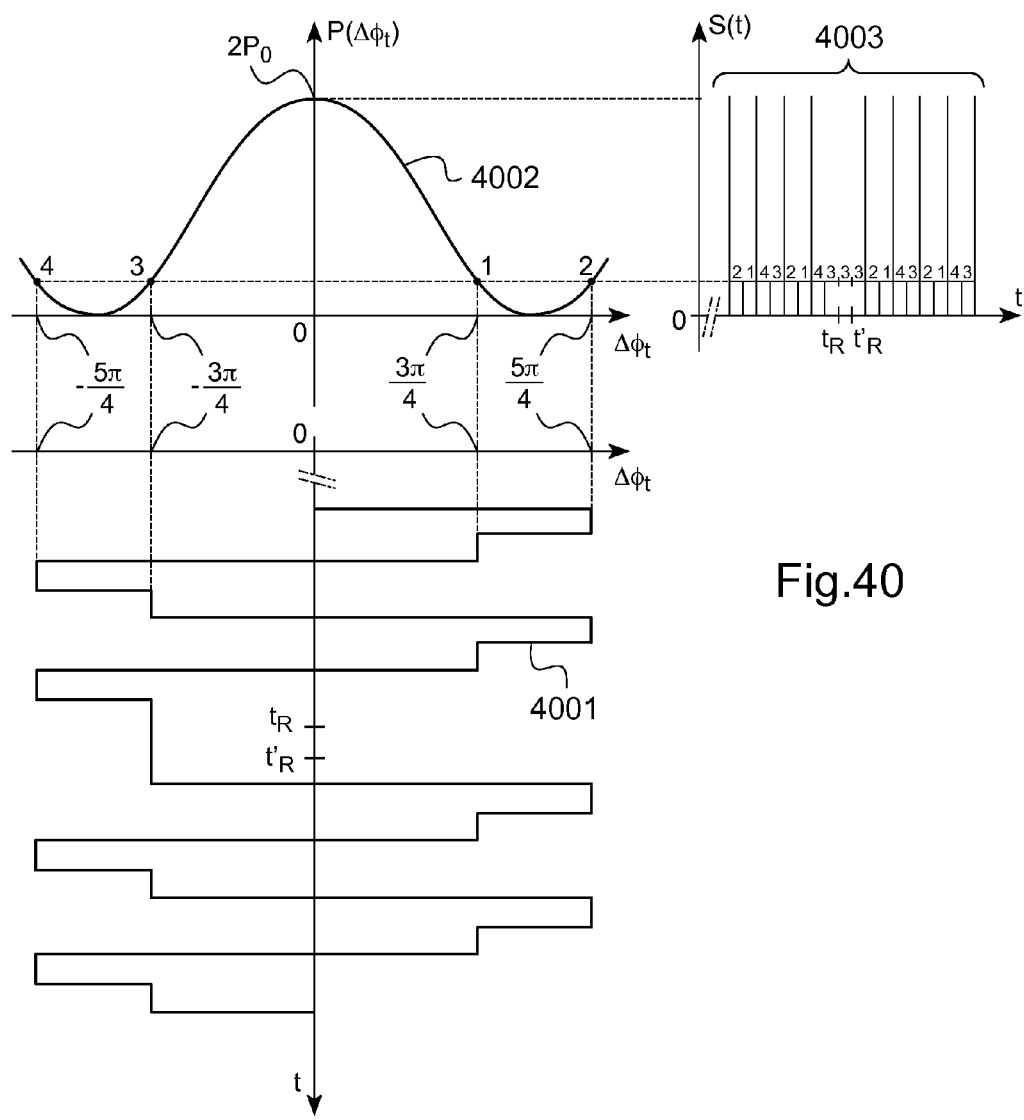

FIG. 29 shows the total phase difference $\Delta\phi_t(t)$ in the second embodiment of the invention, the luminous power received by the detector at the output of the interferometer and the corresponding modulated electrical signal when the first feedback phase-difference modulation component $\Delta\phi_{cr1}(t)$ does not compensate exactly for the phase difference $\Delta\phi_p$ due to the parameter to be measured and when the transfer function of the modulation chain is correctly adjusted;

FIG. 30 shows the total phase difference $\Delta\phi_t(t)$ in the second embodiment of the invention, the luminous power received by the detector at the output of the interferometer and the corresponding modulated electrical signal when the transfer function of the modulation chain is incorrectly adjusted;

FIG. 31 shows a first phase-shift modulation component $\phi_{m1}(t)$ in a third embodiment of the invention;

FIG. 32 shows a second biasing phase-shift modulation component $\phi_{b2}(t)$ of levels $+\pi/2$ and $-\pi/2$, in the third embodiment of the invention;

FIG. 33 shows the phase-shift modulation $\phi_m(t)$ in the third embodiment, resulting from the summing of the first phase-shift modulation component $\phi_{m1}(t)$ of FIG. 31 and of the second biasing phase-shift modulation component $\phi_{b2}(t)$ of FIG. 32;

FIG. 34 shows the phase-difference modulation $\Delta\phi_m(t)$ corresponding to the phase-shift modulation $\phi_m(t)$ of FIG. 33;

FIG. 35 shows the total phase difference $\Delta\phi_t(t)$ in the third embodiment of the invention, the luminous power received by the detector at the output of the interferometer and the corresponding modulated electrical signal when the transfer function of the modulation chain is correctly adjusted;

FIG. 36 shows a first phase-shift modulation component $\phi_{m1}(t)$ in a fourth embodiment of the invention;

FIG. 37 shows a second phase-shift modulation component $\phi_{m2}(t)$ in a fourth embodiment of the invention;

FIG. 38 shows the phase-shift modulation $\phi_m(t)$ in the fourth embodiment, resulting from the difference between the first phase-shift modulation component $\phi_{m1}(t)$ of FIG. 36 and the second phase-shift modulation component $\phi_{m2}(t)$ of FIG. 37;

FIG. 39 shows the phase-difference modulation $\Delta\phi_m(t)$ corresponding to the phase-shift modulation $\phi_m(t)$ of FIG. 38;

FIG. 40 shows the total phase difference $\Delta\phi_t(t)$ in the fourth embodiment of the invention, the luminous power received by the detector at the output of the interferometer and the corresponding modulated electrical signal when the transfer function of the modulation chain is correctly adjusted.

DETAILED DESCRIPTION OF THE INVENTION

Figure 1:
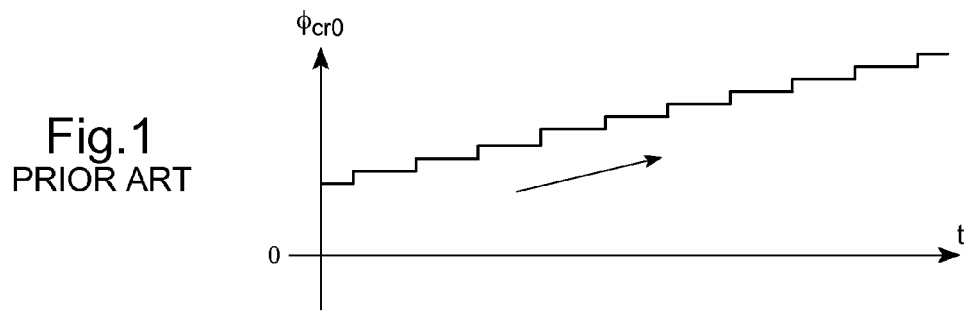
FIG. 1 shows an ascending stair-step feedback phase-shift modulation φ$_{cr0}$ according to the prior art.
Figure 2:
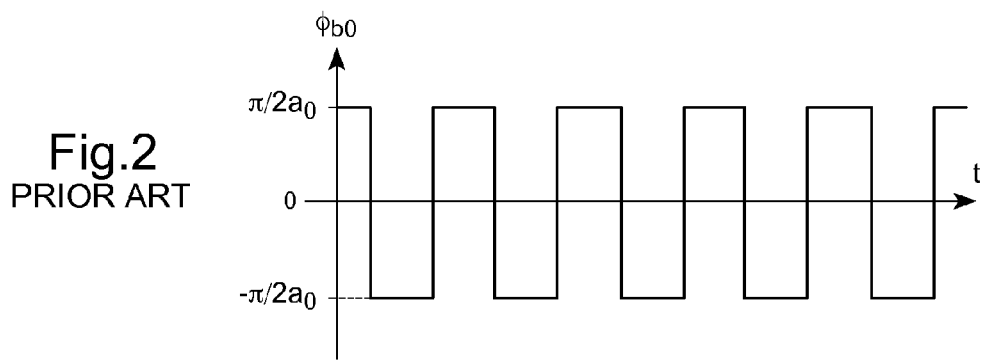
FIG. 2 shows a pulse-wave biasing phase-shift modulation φ$_{b0}$ according to the prior art.
Figure 3:
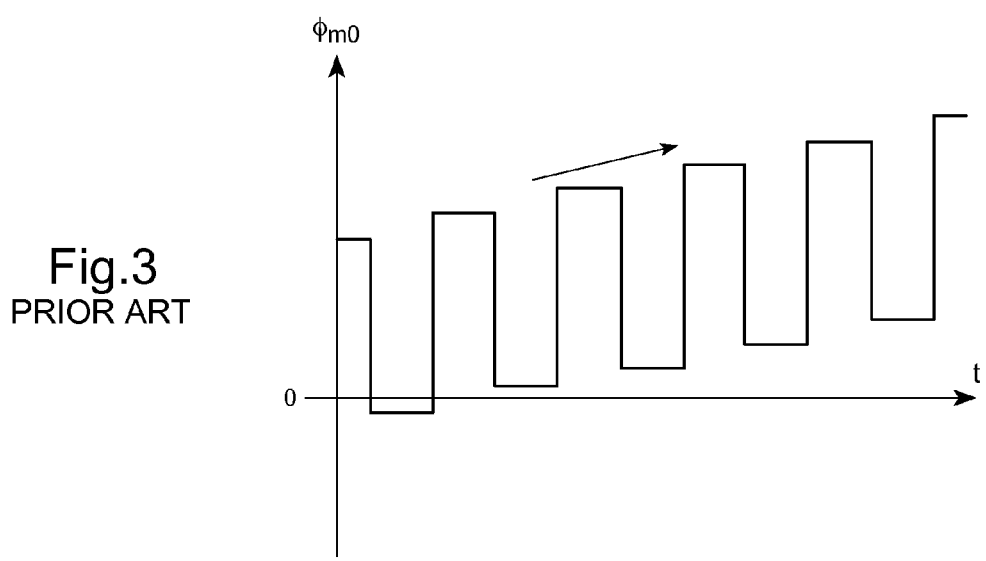
FIG. 3 shows a phase-shift modulation φ$_{m0}$ according to the prior art, which is the sum of the feedback phase-shift modulation φ$_{cr0}$ of FIG. 1 and of the biasing phase-shift modulation φ$_{b0}$ of FIG. 2.
Figure 9:
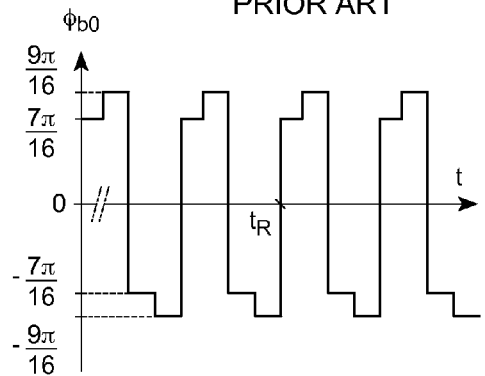
FIG. 9 shows a so-called "4-state" biasing phase-shift modulation φ$_{b0}$ according to the prior art, which passes from a low level to a high level at the instant t=t$_R$.
Figure 11:
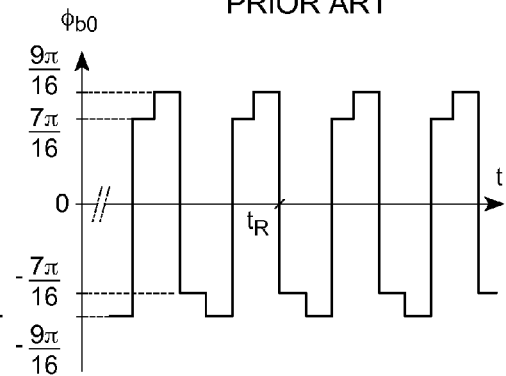
FIG. 11 shows a so-called "4-state" biasing phase-shift modulation φ$_{b0}$ according to the prior art, which passes from a high level to a low level at the instant t=t$_R$.
Figure 10:
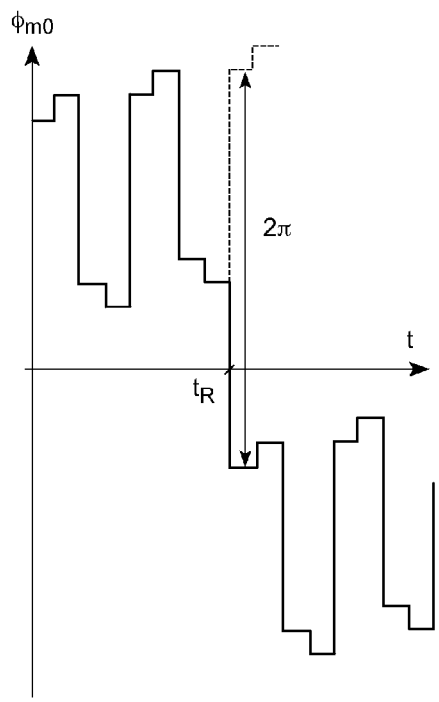
FIG. 10 shows a phase-shift modulation φ$_{m0}$ according to the prior art, which is the sum of the feedback phase-shift modulation φ$_{cr0}$ of FIG. 4 and of the biasing phase-shift modulation φ$_{b0}$ of FIG. 9.
Figure 12:
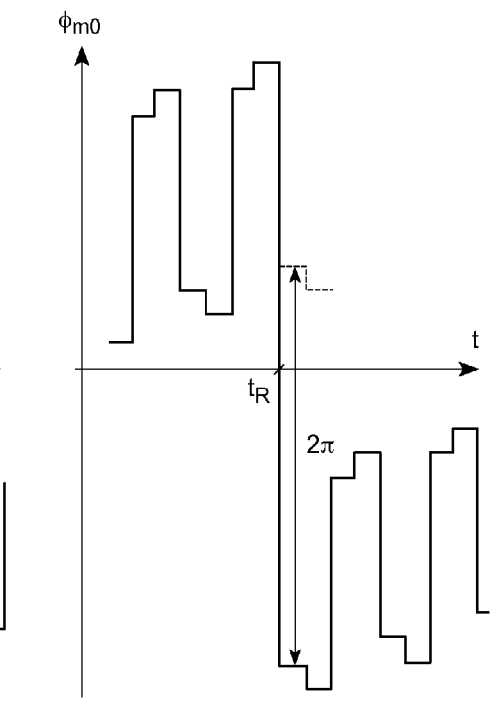
FIG. 12 shows a phase-shift modulation φ$_{m0}$ according to the prior art, which is the sum of the feedback phase-shift modulation φ$_{cr0}$ of FIG. 4 and of the biasing phase-shift modulation φ$_{b0}$ of FIG. 11.
Figure 13:
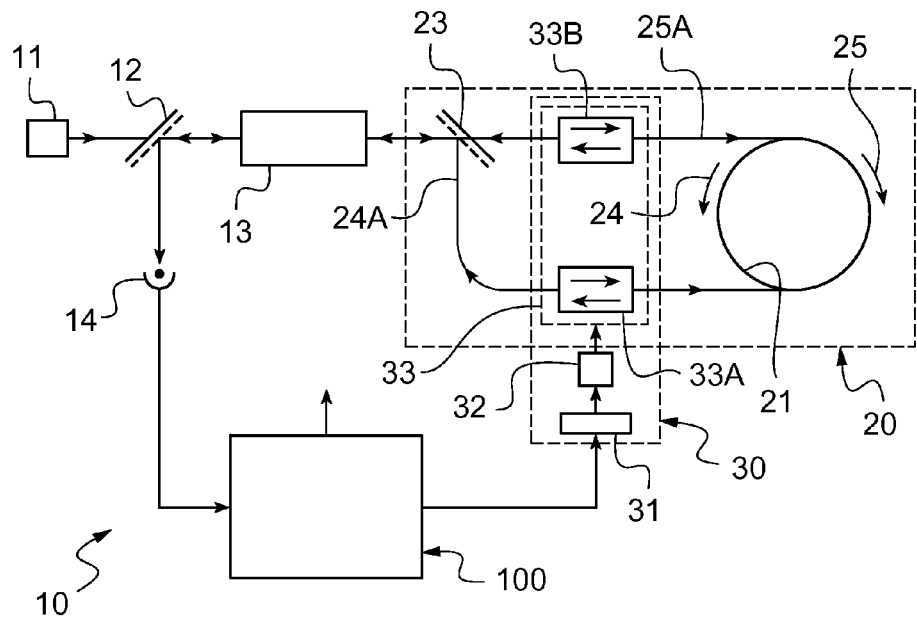
FIG. 13 shows a schematic view of the measurement device according to the prior art.

FIG. 13 shows a fibre-optic measurement device 10 according to the prior art, of the type in which a parameter to be measured generates a phase difference $\Delta\phi_p$ between two waves.

The fibre-optic measurement device 10 first includes a light source 11 herein comprising a laser diode.

As a variant, the light source may comprise for example a super-luminescent diode or a doped-fibre light source of the ASE ("Amplified Spontaneous Emission") type.

The device 10 also comprises a first splitting element 12. This first splitting element 12 is herein a semi-reflective plate having a transmittance of 50% and a reflectance of 50%.

As a variant, the splitting element may be, for example, a –3-decibel 2×2 coupler or an optical circulator.

The luminous wave emitted by the light source 11 is hence transmitted in part by the first splitting element 12 towards an optical filter 13 at the output of which the luminous wave has been filtered. The optical filter 13 preferably includes a polarizer and a spatial filter. This spatial filter is herein a single-mode optical fiber, preferably of the polarization-maintaining type.

The device 10 also includes a SAGNAC ring interferometer 20 comprising a fiber-optic coil 21 wound around itself. It is herein an optical fiber, preferably of the single-mode and polarization-maintaining type.

This SAGNAC ring interferometer 20 also comprises a second splitting element 23 allowing to split the wave exiting from the optical filter 13 into two counter-propagating waves 24, 25 on the two arms of the ring interferometer 20, these two arms defining two optical paths 24A and 25A. The second splitting element 23 is herein a semi-reflective plate having a transmittance of 50% and a reflectance of 50%.

The second splitting element 23 also allows to recombine the two counter-propagating waves 24, 25 at the output of the ring interferometer 20.

As a variant, the second splitting element may be, for example, a –3-decibel 2×2 coupler or a "Y"-junction in integrated optics.

The two counter-propagating waves 24, 25 then pass through the optical filter 13 and are reflected by the first splitting element 12 towards an electromagnetic radiation detector 14.

This detector 14 is a semi-conductor photodiode.

The detector 14 is sensitive to the luminous power P received, which is herein function of the interference state between the two counter-propagating waves 24, 25 during their recombination at the output of the SAGNAC ring interferometer 20. It hence delivers an electrical signal that is representative of the total phase difference $\Delta\phi_t$ between the two counter-propagating waves 24, 25.

It is known that, for a SAGNAC ring interferometer 20, the luminous power $P(\Delta\phi_t)$ received by the detector as a function of the total phase difference $\Delta\phi_t$ is a cosine function of this total phase difference $\Delta\phi_t$, i.e. the following relation is satisfied: $P(\Delta\phi_t)=P0[1+\cos(\Delta\phi_t)]$.

It will be seen in the following of the description that this electrical signal is a modulated electrical signal.

The device 10 also includes a modulation chain 30 comprising a digital/analog converter 31, an amplifier 32 and a phase modulator 33.

The digital/analog converter 31 processes a digital control signal delivered by the electronic means 100, the decomposition of this signal being described in detail hereinafter. The digital/analog converter 31 delivers as an output an analog control signal.

The amplifier 32 then processes this analog control signal to deliver a modulation control voltage $V_m(t)$ to the phase modulator 33.

The phase modulator 33 is placed in the ring interferometer 20 and is thus also a part thereof. It herein advantageously comprises a pair of elementary phase modulators 33A, 33B mounted in "push-pull" configuration, placed respectively at each of the ends of the arms of the SAGNAC ring interferometer 20.

It is known that the "push-pull" mounting allows to eliminate the response of the phase modulator 33 and the non-linearities of even order ($2^{nd}$ order, $4^{th}$ order, etc. . . . ). Hence, the modulation chain 30 has an odd non-linear response with for main components the component of $1^{st}$ order (linear component) and the component of $3^{rd}$ order.

The elementary phase modulator 33A, 33B are herein of the so-called "Pockels effect", electro-optical type, in proton-exchange lithium-niobate integrated optics.

The phase modulator 33 allows, when the time-dependant control modulation voltage $V_m(t)$ is applied at the input thereof, to generate a proportional phase-shift modulation $\phi_m(t)$, and thus with the same time dependency, in a luminous wave passing through it at the given instant t in one direction or another.

In the case of the SAGNAC ring interferometer 20 shown in FIG. 13, the transit-time difference of the counter-propagating waves 24, 25 along the two optical paths 24A, 25A between the phase modulator 33 and the second splitting element 23 is denoted $\Delta\tau_g$.

Hence, the phase-shift modulation $\phi_m(t)$ generated by the phase modulator 33 controlled by the modulation control voltage $V_m(t)$ introduces between the two counter-propagating waves 24, 25, a phase-difference modulation $\Delta\phi_m(t)$ such that: $\Delta\phi_m(t)=\phi_m(t)-\phi_m(t-\Delta\tau_g)$.

The transit-time difference $\Delta\tau_g$ also defines a proper frequency $f_p$ of the SAGNAC ring interferometer 20 by the relation: $f_p=1/(2\Delta\tau_g)$.

This proper frequency $f_p$ thus depends on the length of the coil 21 in the SAGNAC ring interferometer 20. With the fiber-optic coil 21 used herein, a coil having a length of 1 kilometer, the proper frequency $f_p$ of the SAGNAC ring interferometer 20 is of about 100 kilohertz (kHz), corresponding to a transit-time difference $\Delta\tau_g$ of 5 microseconds (µs).

The luminous power $P(\Delta\phi_t)$ received by the detector 14 is also modulated and the electrical signal delivered by the detector 14 will thus be a modulated electrical signal, examples of which will be given hereinafter.

This modulated electrical signal is transmitted to electronic means 100 that process it to deliver a signal function of the phase difference $\Delta\phi_p$ and of the parameter to be measured.

Figure 14:
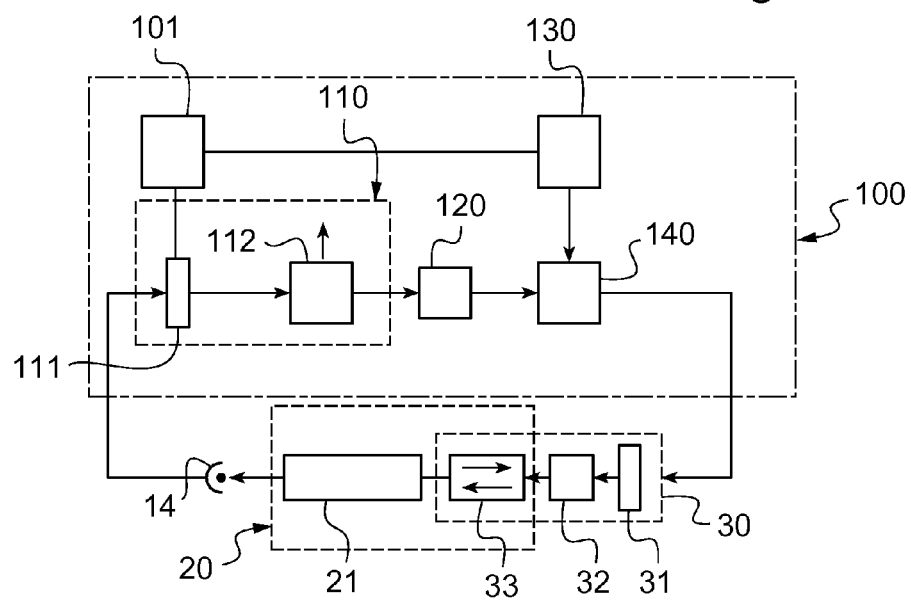
FIG. 14 shows a functional diagram representing the different means implemented in the measurement device according to the invention.

For that purpose, the electronic means 100 comprise signal processing means 110, as shown in FIG. 14. These signal processing means 110 include an analog/digital converter 111 digitizing the modulated electrical signal provided by the detector 14 to deliver a digital electrical signal.

This digitization operation is performed at a synchronization frequency fixed by the clock 101. The synchronization frequency of the clock 101 is preferably a multiple of the proper frequency $f_p$ of the SAGNAC ring interferometer 20.

The signal processing means 110 also comprise a digital processing unit 112 configured to process the digital electrical signal provided at the output of the analog/digital converter 111. The digital processing unit 112 also includes a digital demodulator, a control-loop digital filter fed with a first demodulated digital signal exiting from the digital demodulator and a register.

The digital processing unit 112 delivers a signal function of the phase difference $\Delta\phi_p$ and of the parameter to be measured for any desired external use.

The electronic means 100 also control in return the modulation chain 30.

For that purpose, the electronic means 100 include, on the one hand, biasing means 130 and, on the other hand, feedback means 120.

Figure 15:
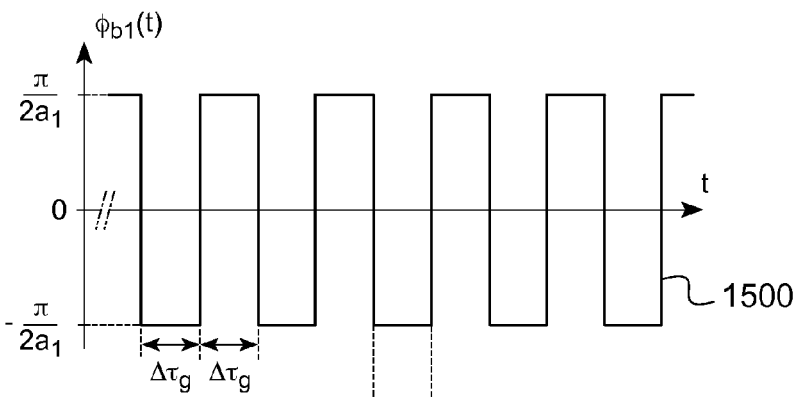
FIG. 15 shows a first biasing phase-shift modulation component φ$_{b1}$(t) as a function of time t.

On one side, the biasing means 130 generate a first biasing signal producing at the output of the modulation chain a first biasing phase-shift modulation component $\phi_{b1}(t)$ as shown in FIG. 15.

This first biasing phase-shift modulation component $\phi_{b1}(t)$ is a pulse-wave modulation having herein a high level of value $\pi/2a_1$ ($a_1$ being a non-zero real number) and a low level of value $-\pi/2a_1$.

This modulation is hence:
 square: the duration of the high level is herein equal to the duration of the low level, and
 of amplitude $\pi/a_1$, the amplitude being defined as the distance between the high level ($\pi/2a_1$) and the low level ($-\pi/2a_1$) of the modulation, i.e. $\pi/2a_1-(-\pi/2a_1)=2(\pi/2a_1)=\pi/a_1$.

As illustrated in FIG. 15, it is advantageous that the first phase-shift modulation component $\phi_{m1}(t)$ is centred about zero. Indeed, this allows to reduce the effects of the non-linearities of the modulation chain 30, in particular thanks to the "push-pull" mounting of the phase modulator 33.

Nevertheless, according to the invention, an equivalent result would be obtained with a non-centred modulation.

Furthermore, the first biasing phase-shift modulation component $\phi_{b1}(t)$ is a periodic modulation at a first biasing modulation frequency $f_{b1}$, which is herein such that $f_{b1}=f_p$, $f_p$ being the proper frequency of the SAGNAC ring interferometer 20. The period of the first biasing phase-shift modulation component $\phi_{b1}(t)$ is thus equal to $2\Delta\tau_g$ and the duration of each of the high and low levels is equal to $\Delta\tau_g$.

Generally, the first biasing modulation frequency $f_{b1}$ may be such that $f_{b1}=(2k_1+1)f_p$, $k_1$ being a natural number and $f_p$ being the proper frequency.

The biasing means 130 are configured so as to generate a first biasing signal at precise instants, synchronized by the frequency of the clock 101.

The biasing means 130 allows to displace the operating point of the measurement device 10 so as to use it with the best possible sensitivity.

Figure 16:
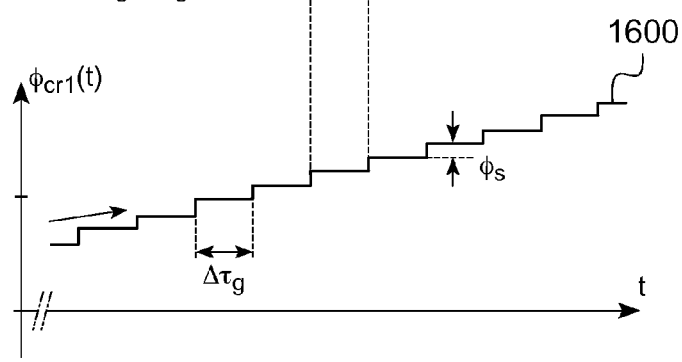
FIG. 16 shows a first feedback phase-shift modulation component φ$_{cr1}$(t) as a function of time t, in the form of an ascending stair-step ramp.

On the other side, the feedback means 120 process the signal function of the phase difference $\Delta\phi_p$ to generate a first feedback signal, producing at the output of the modulation chain a first feedback phase-shift modulation component $\phi_{cr1}(t)$ as shown in FIG. 16.

This first feedback phase-shift modulation component $\phi_{cr1}(t)$ is a stair-step modulation, each stair step having herein a duration $\Delta\tau_g$.

Generally, and when the first biasing modulation frequency $f_{b1}$ is such that $f_{b1}=(2k_1+1)f_p$, the first feedback phase-shift modulation component $\phi_{cr1}(t)$ has stair steps of duration $\Delta\tau_g/(2k_1+1)$.

The first feedback phase-shift modulation component $\phi_{cr1}(t)$ is in phase with the first biasing phase-shift modulation component $\phi_{b1}(t)$, i.e. the first feedback phase-shift modulation component $\phi_{cr1}(t)$ passes from one step to another upon the passage of the first biasing phase-shift modulation component $\phi_{b1}(t)$ from one level to another.

Besides, as illustrated in FIG. 16, the first feedback phase-shift modulation component $\phi_{cr1}(t)$ has stair steps of height $\phi_s$ function of said phase difference $\Delta\phi_p$. The level of each step being herein higher than the previous one, it is hence referred to an ascending ramp for the first feedback phase-shift modulation component $\phi_{cr1}(t)$.

Figure 18:
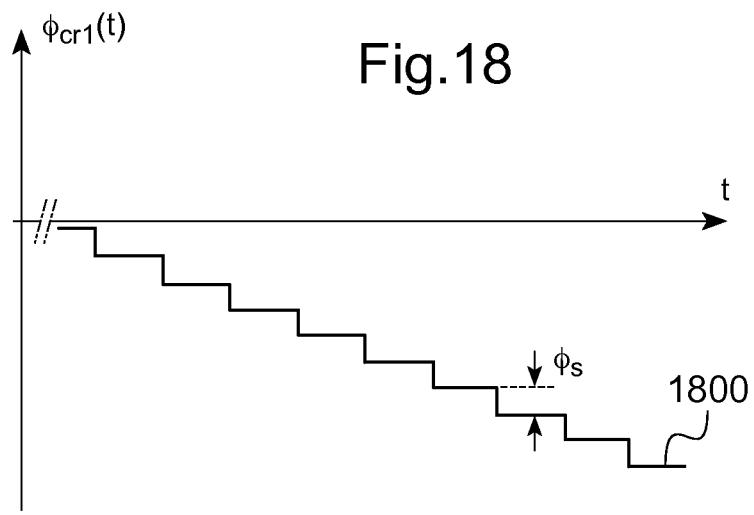
FIG. 18 shows a first feedback phase-shift modulation component φ$_{cr1}$(t) as a function of time t, in the form of a descending stair-step ramp.

FIG. 18 shows an example of the first feedback phase-shift modulation component $\phi_{cr1}(t)$, which is a descending ramp, where the level of each step is lower than the previous one. It will be seen in the following of the description in which case the ramp is ascending and in which case it is descending.

The first feedback phase-shift modulation component $\phi_{cr1}(t)$ introduces, between the two counter-propagation waves 24, 25, a first feedback phase-difference modulation component $\Delta\phi_{cr1}(t)=\phi_{cr1}(t)-\phi_{cr1}(t-\Delta\tau_g)=\phi_s$ that is a function of the phase difference $\Delta\phi_p$.

The feedback means 120 herein include an accumulator.

The electronic means 100 further include control means 140 for controlling the modulation chain 30, which process the first biasing signal and the first feedback signal to deliver at least one first control signal at the input of the modulation chain 30.

This first control signal produces at the output of the modulation chain 30 a first phase-shift modulation component $\phi_{m1}(t)$, which is the phase sum of the first biasing phase-shift modulation component $\phi_{b1}(t)$ and the first feedback phase-shift modulation component $\phi_{cr1}(t)$, such that $\phi_{m1}(t)$ satisfies the relation: $\phi_{m1}(t)=\phi_{b1}(t)+\phi_{cr1}(t)$.

The control means 140 have two inputs and one output. At the input, the control means 140 receive on the one hand the first feedback signal and on the other hand the first biasing signal. These signals are then processed by the control means 140. At the output, the control means 140 deliver the first control signal, which is then transmitted to the modulation chain 30.

Hence controlled, the modulation chain 30 generates a first phase-shift modulation component $\phi_{m1}(t)$ via the phase modulator 33. A first phase-difference modulation $\Delta\phi_{m1}(t)$ is then introduced between the two counter-propagating waves 24, 25 propagating in the SAGNAC ring interferometer 20.

The different particular embodiments of the invention allowing to limit the effects of the non-linearities of the modulation chain 30 on the measurement of the phase difference $\Delta\phi_p$ and of the parameter to be measured will now be described.

1st Embodiment

In this first particular embodiment of the invention, the first biasing modulation component $\phi_{b1}(t)$ 1500 is that shown in FIG. 15, and the first feedback modulation component $\phi_{cr1}(t)$ 1600 is that shown in FIG. 16.

According to the invention, the control means 140 for controlling the modulation chain 30 are arranged in such a manner that the first phase-shift modulation component $\phi_{m1}(t)$ operates a transition of twice the amplitude of the first biasing phase-shift modulation component $\phi_{b1}(t)$, i.e. $2\pi/a_1$, when its level exceeds the amplitude of the first biasing phase-shift modulation component $\phi_{b1}(t)$, i.e. $\pi/a_1$.

Figure 17:
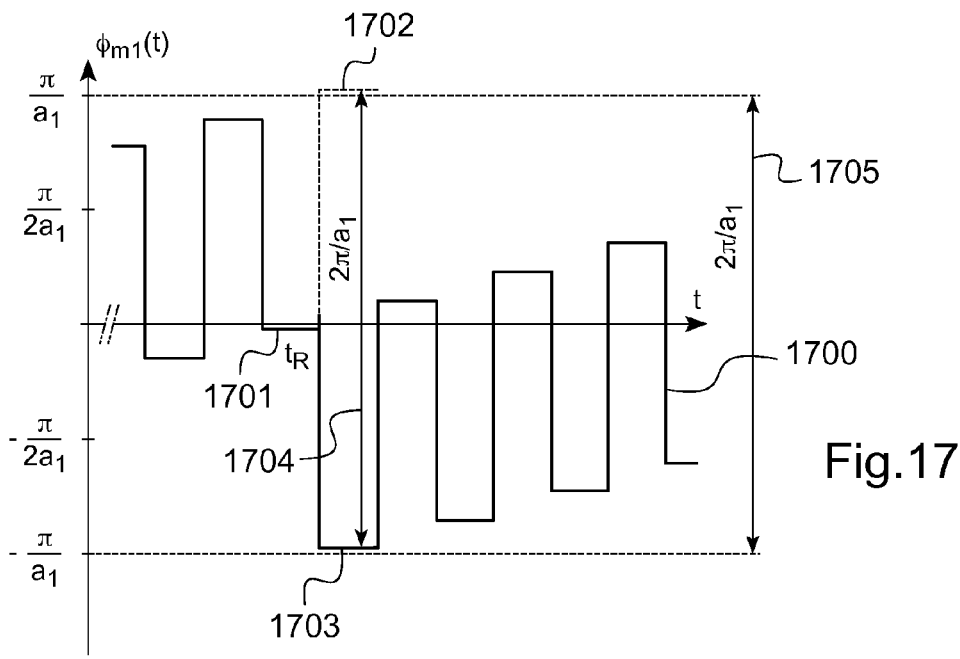
FIG. 17 shows a first phase-shift modulation component φ$_{m1}$(t) as a function of time t, which is the sum of the first biasing phase-shift modulation component φ$_{b1}$(t) of FIG. 15 and of the first feedback phase-shift modulation component φ$_{cr1}$(t) of FIG. 16.

This may be understood at the light of FIG. 17, on which has been shown the first phase-shift modulation component $\phi_{m1}(t)$ 1700, which as the form of an ascending pulse-wave modulation, due to the ascending ramp of FIG. 16.

It can be observed in FIG. 17 that, at the instant $t=t_R$, the first phase-shift modulation component $\phi_{m1}(t)$ had to pass from a low level before falling down 1701 to a high level 1702 shown in dash line.

However, as this high level 1702 is such that it slightly exceeds the value $\pi/a_1$, i.e. the value of the amplitude of the first biasing phase-shift modulation component $\phi_{b1}(t)$ 1500, the control means 140 make the phase-shift modulation component $\phi_{m1}(t)$ 1700 fall down to bring the high level 1702 to the low level after falling down 1703. The amplitude 1704 of this falling down is hence herein equal to $2\pi/a_1$, i.e. twice the amplitude of the first biasing phase-shift modulation component $\phi_{b1}(t)$ 1500.

So formed, the first phase-shift modulation component $\phi_{m1}(t)$ 1700 has a maximal amplitude 1705 equal to $2\pi/a_1$. The amplitude is hence lowered and the excursion on the modulation chain 30 is reduced, limiting the effects of the non-linearities of this modulation chain 30.

According to an advantageous characteristic of this first embodiment of the invention, the first feedback phase-shift modulation component $\phi_{cr1}(t)$ 1600 of FIG. 16 has stair steps of height $\phi_s$ such that: $\phi_s=-\Delta\phi_p$, in such a manner that the feedback phase-difference modulation $\Delta\phi_{cr1}(t)$ is equal to $-\Delta\phi_p$, to compensate for the phase difference $\Delta\phi_p$ due to the parameter to be measured.

This allows in particular to make the device 10 operate in closed loop so as to reach a good linearity and stability of the measurement of the parameter generating the phase difference $\Delta\phi_p$.

In the case where the phase difference $\Delta\phi_p$ due to the parameter to be measured is positive, the height $\phi_s$ of the stair steps of the first feedback phase-shift modulation component $\phi_{cr1}(t)$ 1800 is negative, which means that this first component is a descending ramp, as shown in FIG. 18.

Figure 19:
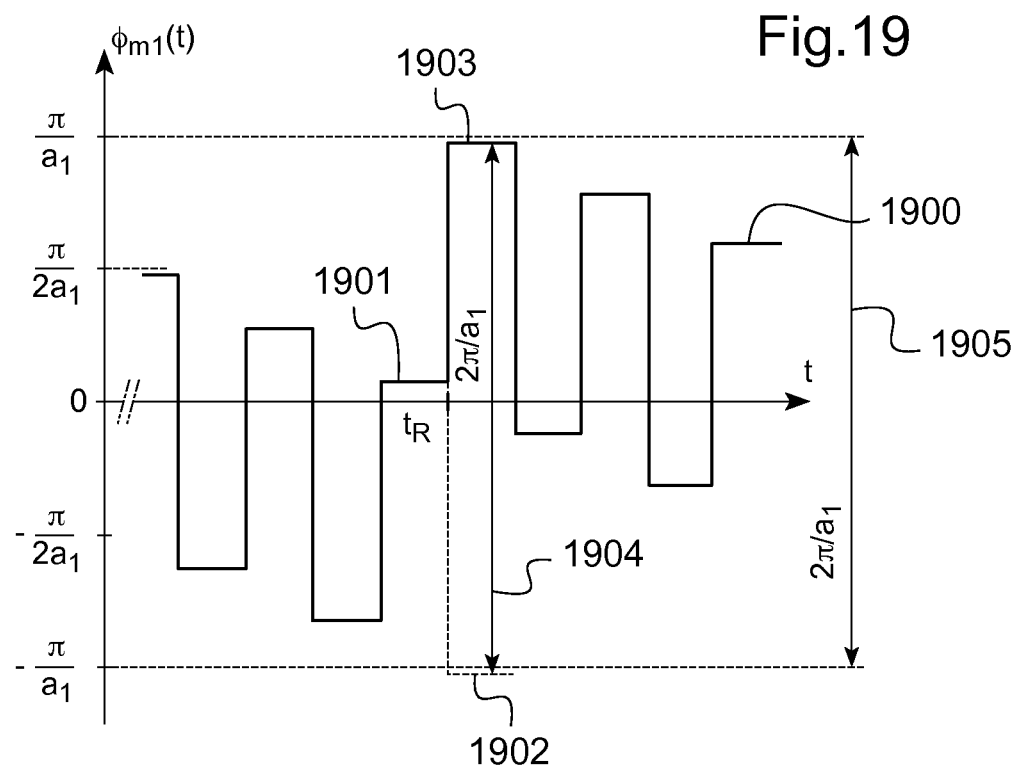
FIG. 19 shows a first phase-shift modulation component φ$_{m1}$(t) as a function of time t, which is the sum of the first biasing phase-shift modulation component φ$_{b1}$(t) of FIG. 15 and of the first feedback phase-shift modulation component φ$_{cr1}$(t) of FIG. 18.

The first phase-shift modulation component $\phi_{m1}(t)$ 1900 then takes the form of a descending pulse-wave modulation (see FIG. 19).

It can be observed in FIG. 19 that, at the instant $t=t_R$, the first phase-shift modulation component $\phi_{m1}(t)$ 1900 had to pass from a high level before falling down 1901 to a low level 1902 shown in dash line.

However, as this low level 1902 is such that it slightly exceeds, in absolute value, the value $\pi/a_1$, i.e. the value of the amplitude of the first biasing phase-shift modulation component $\phi_{b1}(t)$ 1500, the control means 140 make the first phase-shift modulation component $\phi_{m1}(t)$ 1900 rise up, to bring the low level 1902 to the high level after rising up 1903. The amplitude 1904 of this rising up is hence equal to $2\pi/a_1$, i.e. twice the amplitude of the first biasing phase-shift modulation component $\phi_{b1}(t)$ 1500.

So formed, the first phase-shift modulation component $\phi_{m1}(t)$ still has a maximum amplitude 1905 equal to $2\pi/a_1$.

By comparing the cases of FIGS. 17 and 19, corresponding, respectively, to the case of an ascending ramp and to the case of a descending ramp, it is understood that the first phase-shift modulation component $\phi_{m1}(t)$ is caused to fall down or to rise up when the value of the level it should have reached without falling down (or rising up) is higher, in absolute value, than twice the amplitude of the first biasing phase-shift modulation component $\phi_{b1}(t)$.

Moreover, it will be noted that, in this first embodiment of the invention, the falling down (or the rising up) of the first phase-shift modulation component $\phi_{m1}(t)$ is such that the latter has a maximum amplitude, between its highest level and its lowest level, lower than or equal to twice the amplitude of the first biasing phase-shift modulation component $\phi_{b1}(t)$, i.e. $2\pi/a_1$.

Hence, the amplitude of the phase-shift modulation is reduced with respect to the case in which a falling down (or rising up) by $2\pi$ is made on the first feedback phase-shift modulation component $\phi_{cr1}(t)$, independently of its sum with the first biasing phase-shift modulation component $\phi_{b1}(t)$. Indeed, in this case, the maximal amplitude would be of about $2\pi+\pi/a_1$.

It has be shown in FIGS. 20 and 21, respectively, the first phase-difference modulation components $\Delta\phi_{m1}(t)$ introduced between the counter-propagating waves 24, 25 and resulting from the generation of the first phase-shift modulation components $\phi_{m1}(t)$ of FIGS. 17 and 19, respectively, by the modulation chain 30 controlled by the control means 140.

In the case of an ascending ramp (i.e. $\phi_s>0$, case of FIG. 20), the first phase-difference modulation component $\Delta\phi_{m1}(t)$ 2000 is a pulse-wave modulation, having a high level of value $+\pi/a_1+\phi_s$ and a low level of value $-\pi/a_1+\phi_s$, these extreme levels being hence symmetrical with respect to the level line of ordinate $\phi_s$.

The first phase-difference modulation component $\Delta\phi_{m1}(t)$ 2000 has a total amplitude equal to $2\pi/a_1$.

Moreover, it can be observed in FIG. 20 that the first phase-difference modulation component $\Delta\phi_{m1}(t)$ 2000 is alternately at its high level and at its low level, until the instant $t=t_R$ of the falling down of the first phase-shift modulation component $\phi_{m1}(t)$ 1700 (see FIG. 17), where it remains at the same low level 2001, instead of getting to the high level 2002. Next, the first phase-difference modulation component $\Delta\phi_{m1}(t)$ 2000 resumes its alternations between its high level and its low level, and this until the next falling down.

Likewise, in the case of a descending ramp (i.e. $\phi_s<0$, case of FIG. 21), the first phase-difference modulation component $\Delta\phi_{m1}(t)$ 2100 is a pulse-wave modulation, having a high level of value $+\pi/a_1+\phi_s$ and a low level of value $-\pi/a_1+\phi_s$, these extreme levels being thus symmetrical with respect to the level line of ordinate $\phi_s$ (herein $\phi_s<0$).

The first phase-difference modulation component has a total amplitude $\Delta\phi_{m1}(t)$ 2100 equal to $2\pi/a_1$.

Moreover, it can be observed in FIG. 21 that the phase-shift modulation component $\Delta\phi_{m1}(t)$ 2100 is alternately at its high level and at its low level, until the instant $t=t_R$ of the rising up of the phase-shift modulation component $\phi_{m1}(t)$ 1900 (see FIG. 19), where it remains at the same high level 2101, instead of getting to the low level 2102. Next, the first phase-difference modulation component $\Delta\phi_{m1}(t)$ 2100 resumes its alternations between its high level and its low level, until the next rising up.

Figure 22:
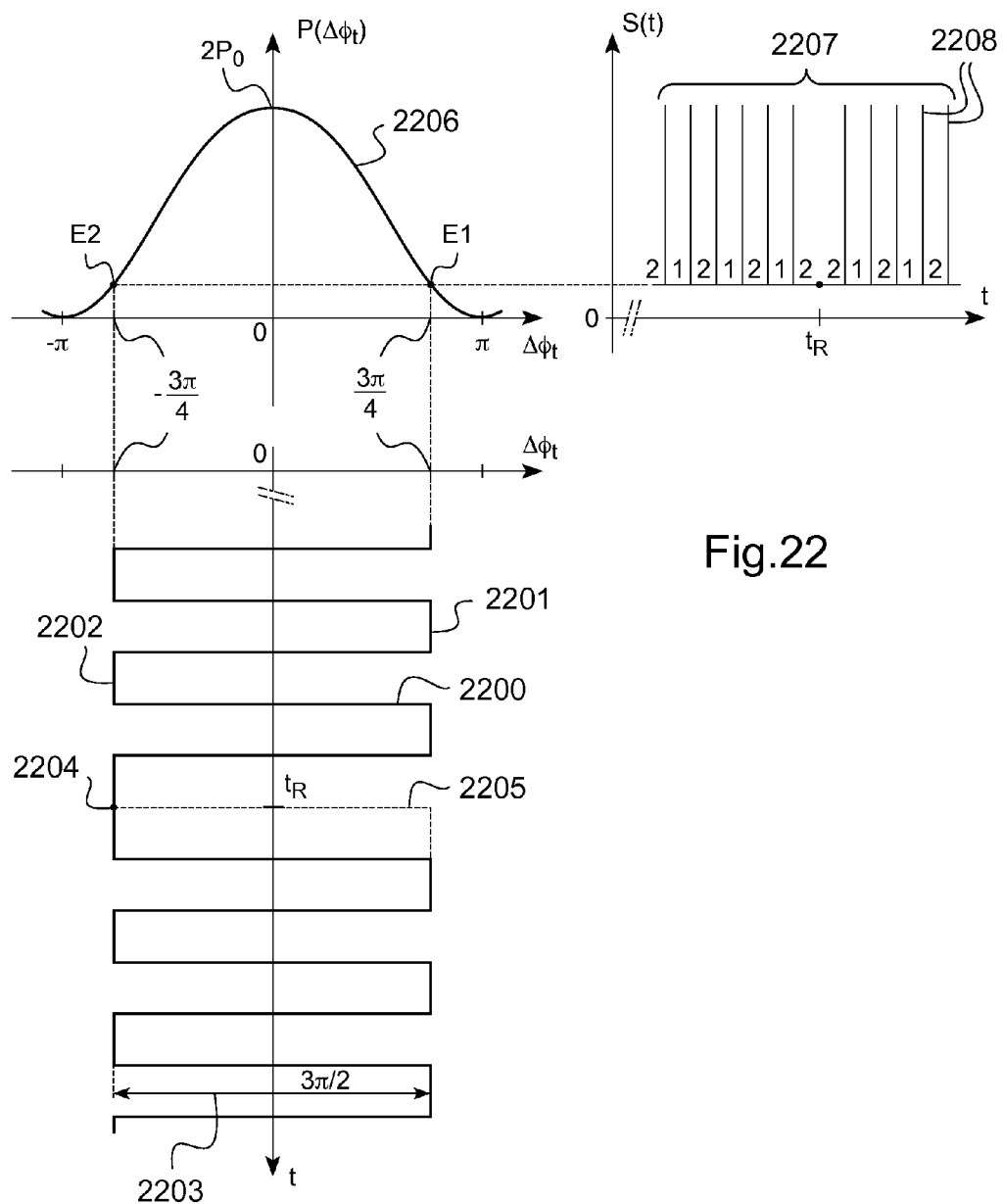
FIG. 22 shows the total phase difference Δφ$_t$(t) in a first embodiment of the invention, the luminous power received by the detector at the output of the interferometer and the corresponding modulated electrical signal.

FIG. 22 is an example of the first embodiment of the invention for which $a_1=4/3$. Hence, in FIG. 22, it has been shown the total phase difference $\Delta\phi_t$ 2200 between the two counter-propagating waves 24, 25 propagating in the SAGNAC ring interferometer 20. The total phase difference $\Delta\phi_t$ is herein the sum of the phase difference $\Delta\phi_p$ due to the parameter to be measured and of the first phase-difference modulation component $\Delta\phi_{m1}$: $\Delta\phi_t=\Delta\phi_p+\Delta\phi_{m1}$.

For this example, the first phase-shift modulation component $\phi_{m1}(t)$ is formed based on:
 a first biasing phase-shift modulation component $\phi_{b1}(t)$ of levels $+3\pi/8$ ($=\pi/2a_1$) and $-3\pi/8$ ($=-\pi/2a_1$), and
 a first feedback phase-shift modulation component $\phi_{cr1}(t)$ such that the step value $\phi_s$ compensates for the phase difference $\Delta\phi_p$ of the parameter to be measured, so that $\phi_s=-\Delta\phi_p$.

Hence, the first phase-difference modulation component $\Delta\phi_{m1}(t)$ introduced between the two counter-propagative waves 24, 25 from the generation of the first phase-shift modulation component $\phi_{m1}(t)$ by the modulation chain 30 is similar to that shown in FIG. 22. This is a pulse-wave modulation, of symmetrical extreme levels, of values $+3\pi/4$ (high level 2201) and $-3\pi/4$ (low level 2202), its total amplitude 2203 being equal to $3\pi/2$.

As explained hereinabove for the first phase-difference modulation component $\Delta\phi_{m1}(t)$, the total phase difference $\Delta\phi_t$ is alternately at its high level and at its low level, until the instant $t=t_R$ of the falling down, where it remains at the same level 2204, instead of getting to the high level 2205 shown in dash line.

It has also been shown in FIG. 22 the response of the ring interferometer 20, i.e. the luminous power received $P(\Delta\phi_t)$ 2206 by the detector at the output of the interferometer. This received luminous power is cosine waveform: $P(\Delta\phi_t)=P_0[1+\cos(\Delta\phi_t)]$, and has a maximum equal to $2P_0$ when the total phase difference $\Delta\phi_t$ is null ($\Delta\phi_t=0$).

The total phase difference $\Delta\phi_t$ being modulated as described above, the luminous power $P(\Delta\phi_t)$ 2206 received by the detector 14 is modulated according to two distinct modulation states:
 a state E1 for which $\Delta\phi_t=\Delta\phi_1=3\pi/4$, and
 a state E2 for which $\Delta\phi_t=\Delta\phi_2=-3\pi/4$.

As can be seen in FIG. 22, the luminous power $P(\Delta\phi_t)$ 2206 received by the detector 14 is the same in the two modulation states E1 and E2. Indeed, the received luminous power $P(\Delta\phi_t)$ 2206 being a cosine function of the total phase difference $\Delta\phi_t$, the following relation is satisfied: $P(\Delta\phi_1)=P(\Delta\phi_2)$.

The detector 14 then delivers a modulated electrical signal S(t) 2207 such as shown in FIG. 22. This modulated electrical signal S(t) 2207 takes sequentially two values S1 and S2 associated with the two modulation states E1 and E2, respectively, of the modulated total phase difference $\Delta\phi_t$.

It will also been observed in FIG. 22 that the modulated electrical signal S(t) 2207 exhibits peaks 2208 corresponding to the transitions from the modulation state E1 to the modulation state E2 (and vice versa), when the received luminous power $P(\Delta\phi_t)$ 2206 passes by a maximum at the value $\Delta\phi_t=0$, this maximum having the value $2P_0$.

These peaks 2208 are cumbersome insofar as they introduce unwanted defects in the modulated electrical signal S(t) 2207.

The modulated electrical signal S(t) 2207 is then digitized by the analog/digital converter 111, which delivers and transmits a digital electrical signal to the digital processing unit 112.

It is important to note herein that the falling down of the first phase-shift modulation component $\phi_{m1}(t)$ at the instant $t=t_R$ creates no defect in the modulated electrical signal S(t) 2207 insofar as the total phase difference $\Delta\phi_t$ does not change during this falling down. Hence, the falling down does not disturb the measurement.

$2^{nd}$, $3^{rd}$ and $4^{th}$ Embodiments of the Invention

FIGS. 23 to 40 relates to three particular embodiments of the invention in the total phase difference $\Delta\phi_t$ between the two counter-propagating waves 24, 25 is no longer modulated according to two modulation states but according to four modulation states. It will be seen in particular how these particular embodiments allow to control the modulation chain 30.

Figure 23:
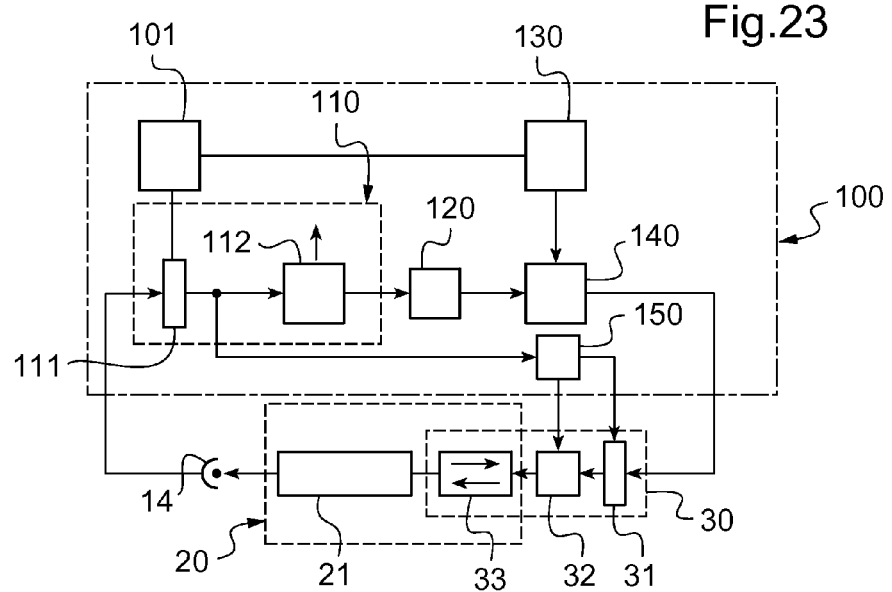
FIG. 23 shows a functional diagram showing the different means implemented in the measurement device according to the invention and comprising means for controlling the transfer function of the modulation chain.

Indeed, advantageously, in these second, third and fourth embodiments of the invention, it is known that the electronic means 100 of the fibre-optic measurement device 10 include gain-control means 150 such as shown in FIG. 23. These gain-control means 150 keep adjusted the transfer function of the modulation chain 30, this transfer function electronically characterizing the modulation chain 30 between its input and its output.

This transfer function characterizes the response of the modulation chain 30: it corresponds to the ratio between the value (in radians) of the phase shift effectively generated by the modulation chain 30 via the phase modulator 33 and the value (with no unit) of the digital control signal transmitted to the modulation chain 30.

The gain control means 150 comprise another digital processing unit (not shown) using the digital electrical signal delivered by the analog/digital converter 111 so as to provide a signal function of the transfer function of the modulation chain 30.

This later signal is filtered by a digital control-loop integrator filter which feeds another digital/analog converter controlling the variable gain G of the amplifier 32 or the reference analog voltage of the digital/analog converter 31.

Hence, the transfer function of the modulation chain 30 is kept correctly adjusted, as well as the modulation control voltage delivered by the amplifier 32 to the phase modulation 33.

It is meant by this that a given value of the digital control signal at the input of the modulation chain 30 will always give the same value (in radians) of phase-shift modulation $\phi_m$ generated by the phase modulator 33, and hence the same value (in radians) of phase-difference modulation $\Delta\phi_m$ introduced between the two counter-propagating waves 24, 25 in the SAGNAC ring interferometer 20.

It will be understood at the light of the following description how operate the control means 150 and how they allow to keep correctly adjusted the transfer function of the modulation chain 30.

2$^{nd}$ Embodiment

It will now be detailed, in FIGS. 24 to 30, a second embodiment of the invention, in which:

$a_1=1$ and $k_1=0$, i.e. the first biasing phase-shift modulation component $\phi_{b1}(t)$ is a square pulse-wave modulation of amplitude π between a high level $+\pi/2$ and a low level $-\pi/2$ and periodic at a first biasing modulation frequency $f_{b1}$ equal to the proper frequency $f_p$ of the SAGNAC ring interferometer 20, and $\Delta\phi_p=-\pi/20$, so that the first feedback phase-shift modulation component $\phi_{cr1}(t)$ is an ascending stair-step modulation of height $\phi_s=-\Delta\phi_p=\pi/20$ compensating for the phase difference $\Delta\phi_p$ due to the parameter to be measured.

Figure 24:
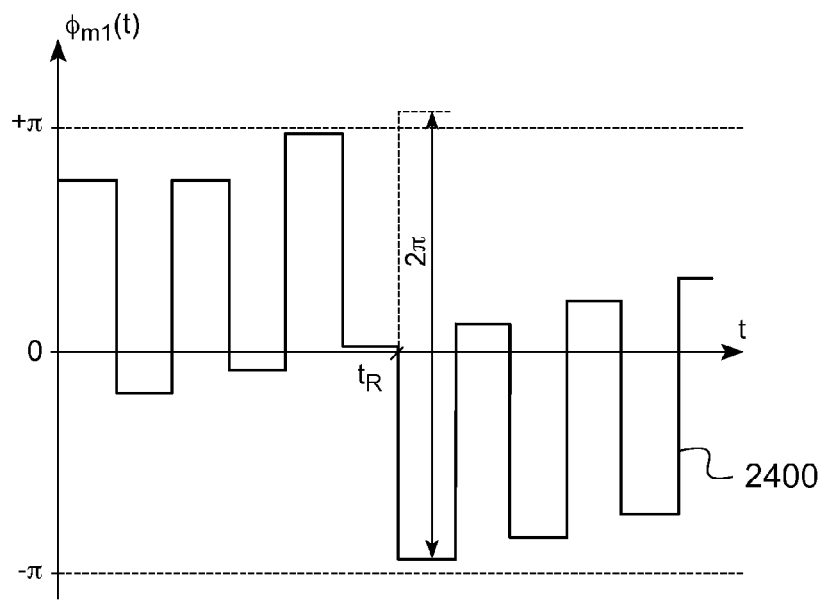
FIG. 24 shows a first phase-shift modulation component φ$_{m1}$(t) in a second embodiment of the invention.
Figure 25:
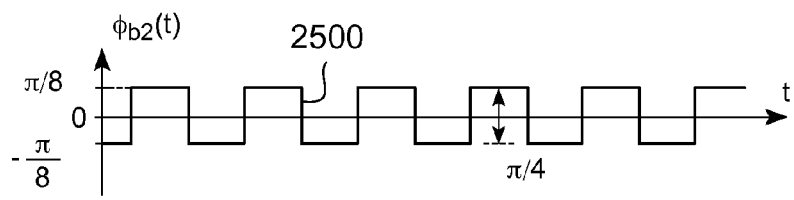
FIG. 25 shows a second biasing phase-shift modulation component φ$_{b2}$(t) of levels +π/8 and −π/8, in a second embodiment of the invention.

Hence, according to the invention, the first phase-shift modulation component $\phi_{m1}(t)$ is such as shown in FIG. 24. It has an ascending pulse-wave modulation shape, which falls down by 2π at the instant $t=t_R$, and has a maximum amplitude lower than 2π.

Furthermore, in this second embodiment of the invention, the biasing means 120 generate a second biasing signal producing at the output of the modulation chain 30 a second biasing phase-shift modulation component $\phi_{b2}(t)$ 2500, this second biasing phase-shift modulation component $\phi_{b2}(t)$ 2500 being (cf. FIG. 25):

a square pulse-wave modulation of amplitude $\pi/a_2=\pi/4$, with herein $a_2=4 \neq a_1=1$, between a high level $+\pi/8$ and a low level $-\pi/8$, periodic at a second biasing modulation frequency $f_{b2}$ such that $f_{b2}=(2k_2+1)f_p=f_p$, with $k_2=k_1=0$ so that $(2k_1+1)=1$ and $(2k_2+1)=1$ are multiple of each other, in quadrature relative to the first biasing phase-shift modulation component $\phi_{b1}(t)$.

It will be defined herein that the first biasing phase-shift modulation component $\phi_{b1}(t)$ and the second biasing phase-shift modulation component $\phi_{b2}(t)$ 2500 are in quadrature when a transition of the first biasing phase-shift modulation component $\phi_{b1}(t)$ from an extreme level to another occurs at equal distance from two successive zeros of the second biasing phase-shift modulation component $\phi_{b2}(t)$ 2500.

Figure 26:
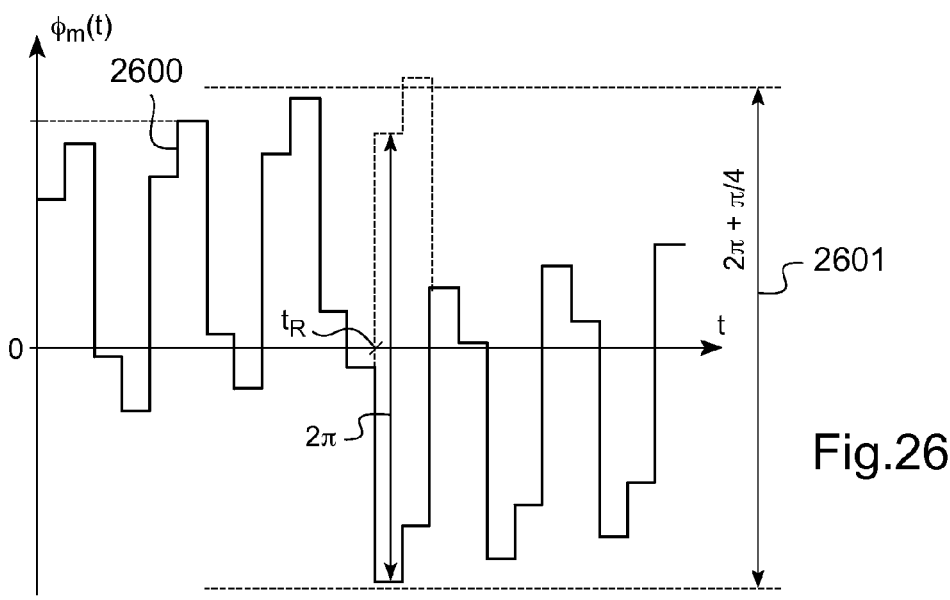
FIG. 26 shows the phase-shift modulation $\phi_m(t)$ in the second embodiment, resulting from the summing of the first phase-shift modulation component $\phi_{m1}(t)$ of FIG. 24 and of the second biasing phase-shift modulation component $\phi_{b2}(t)$ of FIG. 25.

It has been shown in FIG. 26 the phase-shift modulation $\phi_m(t)$ 2600 resulting from the sum of the first phase-shift modulation component $\phi_{m1}(t)$ 2400 and of the second biasing phase-shift modulation component $\phi_{b2}(t)$ 2500.

It can be observed in FIG. 26 that, taking into account that the first feedback phase-shift modulation component $\phi_{cr1}(t)$ is herein an ascending modulation, the first phase-shift modulation component $\phi_{m1}(t)$ 2400 falls down by 2π according to the above-described rule, at the falling down instant $t=t_R$. Likewise, the resulting phase-shift modulation $\phi_m(t)$ 2600 also falls down at the same instant $t=t_R$.

As can be seen in FIG. 26, the maximum amplitude 2601 of the phase-shift modulation $\phi_m(t)$ 2600 is herein equal to $2\pi+\pi/4$.

Figure 27:
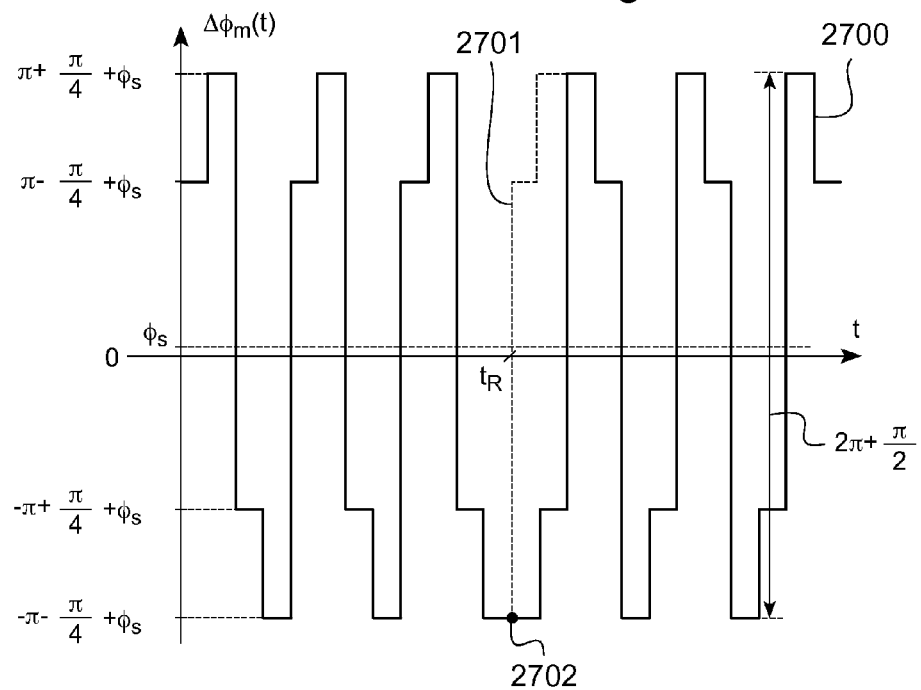
FIG. 27 shows the phase-difference modulation $\Delta\phi_m(t)$ corresponding to the phase-shift modulation $\phi_m(t)$ of FIG. 26.

Hence generated by the phase modulator 33 of the modulation chain 30, the phase-shift modulation $\phi_m(t)$ 2600 introduces between the two counter-propagating waves 24, 25 at the output of the SAGNAC ring interferometer 20 a phase-difference modulation $\Delta\phi_m(t)=\phi_m(t)-\phi_m(t-\Delta\tau_g)$ as shown in FIG. 27.

It can be noted that this phase-difference modulation $\Delta\phi_m(t)$ 2700 oscillates between 4 different levels:

two high levels:
 a first level or level 1 when $\Delta\phi_m(t)=\pi-\pi/4+\phi_s$
 a second level or level 2 when $\Delta\phi_m(t)=\pi+\pi/4+\phi_s$, and two low levels:
 a third level or level 3 when $\Delta\phi_m(t)=-\pi+\pi/4+\phi_s$
 a fourth level or level 4 when $\Delta\phi_m(t)=-\pi-\pi/4+\phi_s$.

As can be seen in FIG. 27, the phase-difference modulation $\Delta\phi_m(t)$ 2700 is hence shifted towards the high side of the value $\phi_s=-\Delta\phi_p$ ($=\pi/20$ herein) as seen above.

It can also be noted that, at the instant $t=t_R$ of the falling down of the phase-shift modulation $\phi_m(t)$, the phase-difference modulation $\Delta\phi_m(t)$ does not rise up (dash line 2701) but remains at its fourth level 2702 during a step duration, to thereafter rise up at the instant $t_R+\Delta\tau_g$ towards the high levels 1 and 2, the phase-difference modulation $\Delta\phi_m(t)$ being symmetrical relative to the falling down instant (that is to say that $\Delta\phi_m(t_R+t)=\Delta\phi_m(t_R-t)$). The alternation between high and low levels then continues until the next falling down.

To sum up, in the second particular embodiment of the invention, it has been seen on the one hand that the parameter to be measured introduces between the two counter-propagating waves a phase difference $\Delta\phi_p=-\pi/20$ at the output of the SAGNAC ring interferometer 20. On the other hand, it has been seen that the counter-propagating means 120 generate a first feedback signal to produce at the output of the modulation chain 30 a first stair-step feedback modulation component $\phi_{cr1}(t)$ of step height $\phi_s=\pi/20$ so as to introduce between the two counter-propagating waves 24, 25 a first feedback phase-difference modulation component $\Delta\phi_{cr1}(t)$ compensating for the phase difference $\Delta\phi_p$ due to the parameter to be measured.

Figure 28:
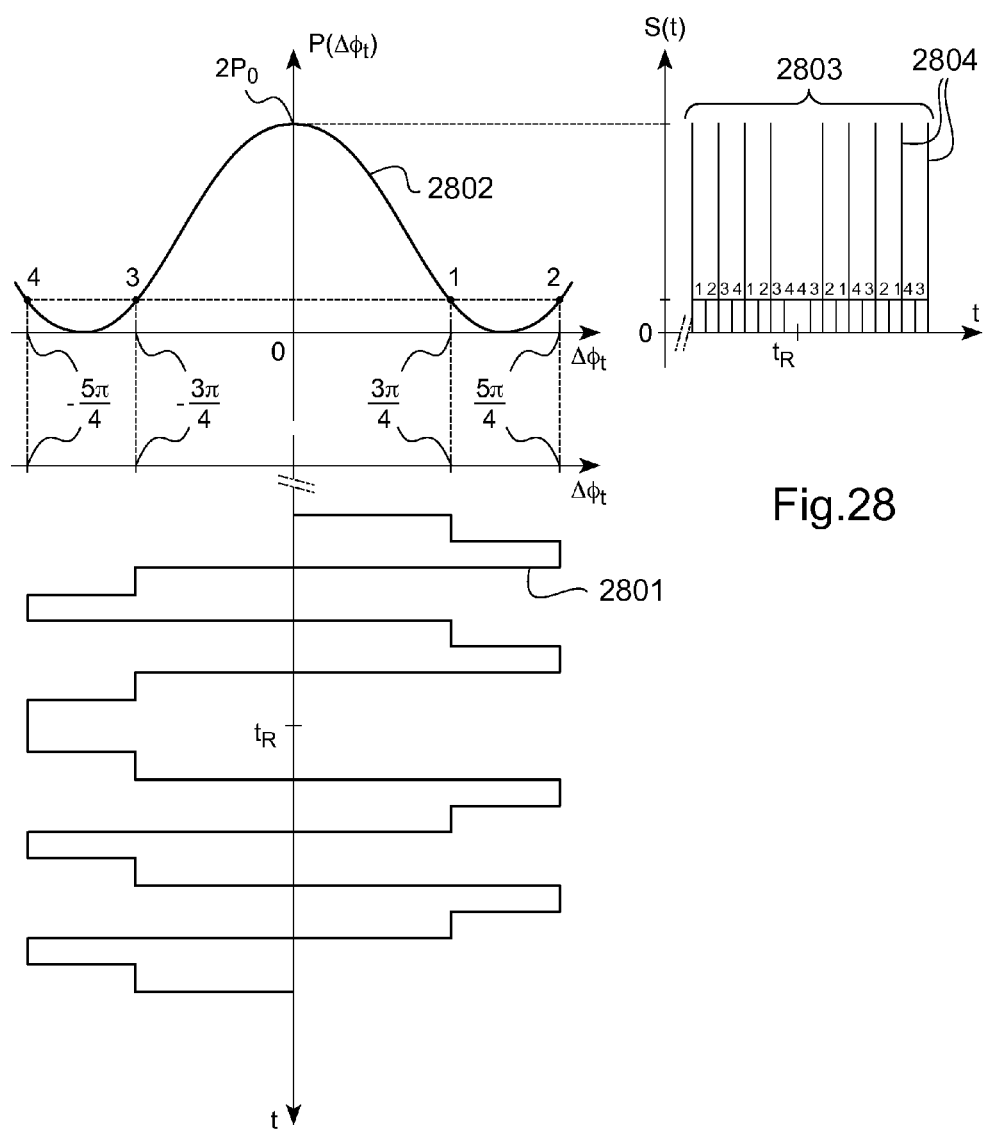
FIG. 28 shows the total phase difference $\Delta\phi_t(t)$ in the second embodiment of the invention, the luminous power received by the detector at the output of the interferometer and the corresponding modulated electrical signal when the transfer function of the modulation chain is correctly adjusted.

Hence, it has been shown in FIG. 28:
the total phase difference $\Delta\phi_t(t)$ 2801 between the two counter-propagating waves 24, 25 at the output of the ring interferometer 20, this total phase difference $\Delta\phi_t(t)$ being such that: $\Delta\phi_t(t)=\Delta\phi_p+\Delta\phi_m(t)$,
the luminous power $P(\Delta\phi_t)$ 2802 received by the detector 14 as a function of the total phase difference $\Delta\phi_t(t)$ 2801, and
the modulated electrical signal $S(t)$ 2803 delivered by the detector 14 as a function of time t.

As the total phase difference $\Delta\phi_t(t)$ is the sum of the phase difference $\Delta\phi_p$ due to the parameter to be measured and of the phase-difference modulation $\Delta\phi_m(t)$, it will first be noted in FIG. 28 that the curve 2801 showing the total phase difference $\Delta\phi_t(t)$ as a function of time t corresponds to the curve 2700 of FIG. 27 showing the phase-difference modulation $\Delta\phi_m(t)$, this curve being shifted towards the abscissa axis of the value of the phase difference $\Delta\phi_p$ due to the parameter to be measured.

Hence, the total phase-difference modulation $\Delta\phi_t(t)$ 2801 has sequentially four different levels defining four different modulation states, which are:
State E1 when the total phase-difference modulation $\Delta\phi_t(t)$ is $\Delta\phi_1=\pi-\pi/4=3\pi/4$,
State E2 when the total phase-difference modulation $\Delta\phi_t(t)$ is $\Delta\phi_2=\pi+\pi/4=5\pi/4$,
State E3 when the total phase-difference modulation $\Delta\phi_t(t)$ is $\Delta\phi_3=-\pi+\pi/4=-3\pi/4$ $(=\Delta\phi_2-2\pi)$,
State E4 when the total phase-difference modulation $\Delta\phi_t(t)$ is $\Delta\phi_4=-\pi-\pi/4=-5\pi/4$ $(=\Delta\phi_1-2\pi)$.

The luminous power $P(\Delta\phi_t)$ 2802 received by the detector 14 is hence modulated following these four distinct modulation states and the modulated electrical signal $S(t)$ 2803 delivered by the detector 14 takes sequentially four values S1, S2, S3, and S4 associated with the four modulation states E1, E2, E3, and E4, respectively, of the total phase-difference modulation $\Delta\phi_t(t)$.

As can be seen in FIG. 28, the luminous power $P(\Delta\phi_t)$ 2802 received by the detector 14 in the four modulation states E1 to E4 is the same. Indeed, the received luminous power $P(\Delta\phi_t)$ 2802 being a cosine function of the total phase difference $\Delta\phi_t$ 2801, the following relation is satisfied: $P(\Delta\phi_1)=P(\Delta\phi_4)$ and $P(\Delta\phi_2)=P(\Delta\phi_3)$. Moreover, the states E1 and E2 (respectively the states E3 and E4) being symmetrical relative to $\pi$ (respectively relative to $-\pi$), the following relations are also satisfied: $P(\Delta\phi_1)=P(\Delta\phi_2)$ and $P(\Delta\phi_3)=P(\Delta\phi_4)$.

The detector 14 then delivers a modulated electrical signal $S(t)$ 2803 such as shown in FIG. 28. This modulated electrical signal $S(t)$ 2803 takes sequentially the four values S1, S2, S3, and S4 associated with the four modulation states E1, E2, E3, and E4, respectively. Taking into account what has been explained regarding the luminous power $P(\Delta\phi_t)$ 2802 received by the detector 14 in the four modulation states E1 to E4, these four values S1, S2, S3, and S4 taken by the modulated electrical signal $S(t)$ 2803 are herein all identical S1=S2=S3=S4.

In particular, as for the first embodiment of the invention described hereinabove, it will also be noted that the falling down 2701 of the phase-difference modulation $\Delta\phi_m(t)$ 2700 at the instant $t=t_R$ (see FIG. 27) creates no defect in the modulated electrical signal $S(t)$ 2803 insofar as the total phase difference $\Delta\phi_t$ 2801 does not change during this falling down ($\Delta\phi_m(t)$ remaining at its low level 2702). Hence, the falling down does not disturb the measurement.

It is nevertheless to be noted in FIG. 28 that the modulated electrical signal $S(t)$ has peaks 2804 corresponding alternately to the transitions from the modulation state E1 to the modulation state E4 and from the modulation state E3 to the modulation state E2, when the received luminous power $P(\Delta\phi_t)$ 2802 passes by a maximum at the value $\Delta\phi_t=0$, this maximum having for value $2P_0$.

These peaks 2804 are cumbersome insofar as they introduce unwanted defects in the modulated electrical signal $S(t)$ 2803.

From the preceding situation, described in FIG. 28, where the parameter to be measured generates a phase difference $\Delta\phi_p$ that is exactly compensated thanks to the first feedback phase-difference modulation component $\Delta\phi_{cr1}(t)$ introduced between the two counter-propagating waves 24, 25 in the SAGNAC ring interferometer 20 by the first, stair-step, feedback phase-shift modulation component $\Delta\phi_{cr1}(t)$, the situation passes to that described in FIG. 29, where the phase difference $\Delta\phi_p$ is not exactly compensated by the first feedback phase-difference modulation component $\Delta\phi_{cr1}(t)$.

This situation can, for example, occur when the parameter to be measured varies abruptly, so that the phase difference $\Delta\phi_p$ also varies abruptly. In this case, it is necessary to wait for a few clock times 101 to come back to the situation of FIG. 27.

It will be considered in this example that the phase difference $\Delta\phi_p$ generated by the parameter is not exactly compensated for, so that the total phase difference $\Delta\phi_t$ is increased by the value $\pi/16$.

This can be shown in FIG. 29 by shifting the curve 2901 representing the total phase difference $\Delta\phi_t$ by the value $\pi/16$. This shift causes a change of the four modulation states on which is modulated the signal received by the detector 14, which is function of the luminous power $P(\Delta\phi_t)$ 2902 received by the latter.

The four levels of the total phase-difference modulation $\Delta\phi_t$ 2901 associated with the four modulation states are hence now:
For the state E1:
$\Delta\phi_t=\Delta\phi_1+\pi/16=3\pi/4+\pi/16=13\pi/16$
For the state E2:
$\Delta\phi_t=\Delta\phi_2+\pi/16=5\pi/4+\pi/16=21\pi/16$
For the state E3:
$\Delta\phi_t=\Delta\phi_3+\pi/16=-3\pi/4+\pi/16=-11\pi/16$
For the state E4:
$\Delta\phi_t=\Delta\phi_4+\pi/16=-5\pi/4+\pi/16=-19\pi/16$.

Hence, as can be seen in FIG. 29, the luminous power $P(\Delta\phi_t)$ 2902 received by the detector 14 in the modulation states E1 and E4 is lower, and that received in the modulation states E2 and E3 is higher.

The detector 14 then delivers a modulated electrical signal $S(t)$ 2903 such as shown in FIG. 29. This modulated electrical signal $S(t)$ 2903 takes sequentially the four values S1, S2, S3 and S4 associated with the four modulation states E1, E2, E3 and E4, respectively. These four values S1, S2, S3 and S4 taken by the modulated electrical signal $S(t)$ 2903 are herein identical two by two: S1=S4 and S2=S3.

The modulated electrical signal $S(t)$ 2903 is then digitalized by the analog/digital converter 111 that delivers and transmits a digital electric signal to the digital processing unit 112.

This digital electrical signal is also modulated and takes four digital values $\Sigma1$, $\Sigma2$, $\Sigma3$, and $\Sigma4$ according to the four modulation states E1, E2, E3, and E4 of the total phase-difference modulation $\Delta\phi_t$ 2901.

The digital processing unit 112 demodulates the digital electrical signal in phase with the second biasing phase-shift modulation component $\phi_{b2}(t)$ (cf. FIG. 25) independently of the first phase-shift modulation component $\phi_{m1}(t)$ (cf. FIG. 26).

It is meant by this that the digital processing unit 112 delivers a first demodulated digital signal $\Sigma_p$ based on the 4 digital values $\Sigma 1$, $\Sigma 2$, $\Sigma 3$, and $\Sigma 4$ associated with the 4 modulation states E1, E2, E3, and E4, respectively, by performing a calculation operation of the type: $\Sigma_p = -\Sigma 1 + \Sigma 2 + \Sigma 3 - \Sigma 4$ where the weight of each digital value in the previous expression depends on the sign of the second biasing phase-shift modulation component $\phi_{b2}(t)$, in the modulation state associated with this digital value, but does not depend on the level of the first phase-shift modulation component $\phi_{m1}(t)$, in this modulation state.

The digital processing unit 112 hence produces a first demodulated digital signal $\Sigma_p$ depending on the phase-shift $\Delta\phi_p$ and representative of the value of the parameter to be measured in the SAGNAC ring interferometer 20.

In a closed-loop operation, the first demodulated digital signal $\Sigma_p$ serves as an error signal to control the total phase difference $\Delta\phi_t$ to zero by compensating for the non-reciprocal phase-shift $\Delta\phi_p$ with the opposite phase-shift $\Delta\phi_{cr1}$ introduced by the phase modulator 33 controlled by the feedback means 120.

This phase-shift $\Delta\phi_{cr1}$ being generated through the same modulation chain 30 as the biasing modulation $\phi_{b1}$, the control of the modulation chain 30, whose operation is detailed hereinafter, hence allows to have a steady and controlled measurement of $\Delta\phi_{cr1}$, and hence finally of $\Delta\phi_p$, which is opposite thereto and which is the parameter that is desired to be measured.

FIG. 30 shows the case of a fibre-optic measurement device 10 according to the second embodiment of the invention, in which the transfer function of the modulation chain 30 in incorrectly adjusted.

In practice, the transfer function, which depends on the characteristics of both the digital/analog converter 31 via its analog reference voltage and the amplifier 32 via its variable gain G, may undergo variations as a function of the measurement conditions, for example the operating temperature of the device 10 or the electrical drift of certain electronic components of the electronic means 100. Generally, the parameters influencing the transfer function cause low and slow variations of the latter, so that the gain control means 150 operate easily and rapidly so as to keep adjusted the transfer function of the modulation chain 30.

The fact that the transfer function of the modulation chain 30 is incorrectly adjusted translates at the level of the total phase difference $\Delta\phi_t$ by a dilatation of the curve of FIG. 28 representing the total phase $\Delta\phi_t$ so that the total phase difference $\Delta\phi_t$ 3001 is similar to that shown in FIG. 30.

Hence, this dilatation (herein of ratio 16/15) causes a change of the four modulation states E1, E2, E3, and E4, on which is modulated the signal received by the detector 14, which is function of the received luminous power $P(\Delta\phi_t)$ 3002 at the output of the SAGNAC ring interferometer 20.

The four levels of the total phase-difference modulation $\Delta\phi_t$ 3001 associated with the four modulation states in the example of FIG. 30 are hence:

For the state E1:
$\Delta\phi_t = (16/15) \cdot \Delta\phi_1 = 4\pi/5$
For the state E2:
$\Delta\phi_t = (16/15) \cdot \Delta\phi_2 = 4\pi/3$
For the state E3:
$\Delta\phi_t = (16/15) \cdot \Delta\phi_3 = -4\pi/5$
For the state E4:
$\Delta\phi_t = (16/15) \cdot \Delta\phi_4 = -4\pi/3$.

Hence, the luminous power $P(\Delta\phi_t)$ 3002 received by the detector 14 in the modulation states E1 and E3 is identical, but lower than the received luminous power when the transfer function of the modulation chain 30 is correctly adjusted, as in FIGS. 28 and 29.

Likewise, the luminous power $P(\Delta\phi_t)$ 3002 received by the detector 14 in the modulation states E2 and E4 is identical, but higher than the received luminous power when the transfer function of the modulation chain 30 is correctly adjusted, as in FIGS. 28 and 29.

The detector 14 then delivers a modulated electrical signal S(t) 3003 such as shown in FIG. 30. This modulated electrical signal S(t) 3003 takes sequentially four values S1, S2, S3, and S4 associated with the four modulation states E1, E2, E3, and E4, respectively. These four values are herein identical two by two: S1=S3 and S2=S4.

The four values $\Sigma 1$, $\Sigma 2$, $\Sigma 3$, and $\Sigma 4$ of the digital electrical signal associated with the four modulation states E1, E2, E3 and E4, respectively, being also identical two by two, with $\Sigma 1 = \Sigma 3$ and $\Sigma 2 = \Sigma 4$, the first demodulated digital signal $\Sigma_p$, calculated by the operation $\Sigma_p = -\Sigma 1 + \Sigma 2 + \Sigma 3 - \Sigma 4$, is hence zero.

Besides, the digital electrical signal delivered by the analog/digital converter 111 is transmitted to the gain control means 150 such as shown in FIG. 23.

The gain control means 150 demodulate the digital electric signal so as to provide a signal function of the transfer function of the modulation chain 30.

More precisely, the other digital processing unit of the gain control means 150 operate a calculation operation of the type: $\Sigma_G = \Sigma 1 - \Sigma 2 + \Sigma 3 - \Sigma 4$, so as to produce a second demodulated digital signal $\Sigma_G$ independent of the phase difference $\Delta\phi_p$ generated by the parameter to be measured, but significant of the transfer function of the modulation chain 30.

In particular, in the case shown in FIG. 30, the second demodulated digital signal $\Sigma_G$ is non-zero, the transfer function of the modulation chain 30 being incorrectly adjusted.

The second demodulated digital signal $\Sigma_G$ then serves as an error signal for a control loop of the transfer function of the modulation chain 30.

For that purpose, the second demodulated digital signal $\Sigma_G$ is filtered by a control-loop digital integrator filter that then feeds the digital/analog converter 31 to control its analog reference voltage or the amplifier 32 to control its variable gain G.

Hence, the transfer function of the modulation chain 30 is kept correctly adjusted between the value of the digital control signal and the value of the phase-shift modulation effectively applied by the phase modulator 33.

It will be observed that, in the case of FIGS. 28 and 29, the second demodulated digital signal $\Sigma_G$ is zero because the transfer function of the modulation chain 30 is correctly adjusted.

Indeed, in this case:
$\Sigma 1 = \Sigma 4$, the received luminous power $P(\Delta\phi_t)$ received in the state E1 and in the state E4 being the same, and
$\Sigma 2 = \Sigma 3$, the received luminous power $P(\Delta\phi_t)$ received in the state E2 and in the state E3 being the same.

3$^{rd}$ Embodiment

A third embodiment of the invention will now be detailed with reference to FIGS. 31 to 35. In this embodiment:
$a_1 = 4$ and $k_1 = 0$, i.e. the first biasing phase-shift modulation component $\phi_{b1}(t)$ is a square pulse-wave modulation of amplitude $\pi/4$ between a high level $+\pi/8$ and a low level $-\pi/8$ and periodic at a first phase-shift modulation frequency $f_{b1}$ equal to the proper frequency $f_p$ of the SAGNAC ring interferometer 20, and $\Delta\phi_p=-\pi/40$ so that the first feedback phase-shift modulation component $\phi_{m1}(t)$ is an ascending stair-step modulation of step height $\phi_s=-\Delta\phi_p=\pi/40$ compensating for the phase difference $\Delta\phi_p$ due to the parameter to be measured.

Hence, according to the invention, the first phase-shift modulation component $\phi_{m1}(t)$ 3100 is such as shown in FIG. 31. It has an ascending pulse-wave modulation shape, falls down by $2\pi/4$ ($=\pi/2$) at the instant $t=t_R$, and has a maximum amplitude lower than $2\pi/4$ ($=\pi/2$).

Furthermore, in this third embodiment of the invention, the biasing means 120 generate a second biasing signal producing at the output of the modulation chain 30 a second biasing phase-shift modulation component $\phi_{b2}(t)$ 3200, this second biasing phase-shift modulation component $\phi_{b2}(t)$ 3200 being (cf. FIG. 32):

a square pulse-wave modulation of amplitude $\pi/a_2=\pi$, with herein $a_2=1\neq a_1=4$, between a high level $+\pi/2$ and a low level $-\pi/2$, periodic at a second phase-shift modulation frequency $f_{b2}$ such that $f_{b2}=(2k_2+1)f_p=f_p$, with $k_2=k_1=0$ so that $(2k_1+1)=1$ and $(2k_2+1)=1$ are multiple of each other, in quadrature with respect to the first biasing phase-shift modulation component $\phi_{b1}(t)$.

It has been shown in FIG. 33 the phase-shift modulation $\phi_m(t)$ 3300 resulting, for the third embodiment, from the sum of the first phase-shift modulation component $\phi_{m1}(t)$ 3100 and of the second phase-shift modulation component $\phi_{b2}(t)$ 3200.

It can be seen in FIG. 33 that, taking into account that the first feedback phase-shift modulation component $\phi_{cr1}(t)$ is an ascending modulation, the first phase-shift modulation component $\phi_{m1}(t)$ 3100 falls down by $2\pi/4$ according to the above-described rule, at the falling down instant $t=t_R$. Likewise, the resulting phase-shift modulation $\phi_m(t)$ 3300 also falls down at the same instant $t=t_R$.

As can be seen in FIG. 33, the maximum amplitude 3301 of the phase-shift modulation $\phi_m(t)$ 3300 is herein equal to $2(\pi/4)+\pi$.

Hence generated by the phase modulator 33 of the modulation chain 30, the phase-shift modulation $\phi_m(t)$ introduces between the two counter-propagating waves 24, 25 at the output of the SAGNAC ring interferometer 20 a phase-difference modulation $\Delta\phi_m(t)=\phi_m(t)-\phi_m(t-\Delta\phi_g)$ such as shown in FIG. 34.

It can be observed, for this third embodiment, that this phase-difference modulation $\Delta\phi_m(t)$ 3400 oscillates between 4 different levels:

two high levels:
a first level or level 1 when $\Delta\phi_m(t)=\pi-\pi/4+\phi_s$
a second level or level 2 when $\Delta\phi_m(t)=\pi+\pi/4+\phi_s$, and two low levels:
a third level or level 3 when $\Delta\phi_m(t)=-\pi+\pi/4+\phi_s$
a forth level or level 4 when $\Delta\phi_m(t)=-\pi-\pi/4+\phi_s$.

As can be seen in FIG. 34, the phase-difference modulation $\Delta\phi_m(t)$ 3400 is hence shifted towards the high side of the value $\phi_s=-\Delta\phi_p$ ($=\pi/40$ herein) as seen above.

Moreover, it can be observed that, at the instant $t=t_R$ of the falling down of the phase-shift modulation $\phi_m(t)$, the phase-difference modulation $\Delta\phi_m(t)$ does not rise up (dash line 3401) but remains at its first level 3402 during half a step duration, to then fall down at the instant $t_R+(\Delta\tau_g/2)$ towards the third level 3403, the phase-difference modulation $\Delta\phi_m(t)$ being symmetrical with respect to the instant of the falling down (i.e. that $\Delta\phi_m(t_R+t)=\Delta\phi_m(t_R-t)$). The alternation between high levels and low levels then continue until the next falling down.

To sum up, in the third particular embodiment of the invention, it has been seen on the one hand that the parameter to be measured introduces between the two counter-propagating waves a phase difference $\Delta\phi_p=-\pi/40$ at the output of the SAGNAC ring interferometer 20. On the other hand, it has been seen that the feedback means 120 generate a first feedback signal to produce at the output of the modulation chain 30 a first stair-step feedback phase-shift modulation component $\phi_{cr1}(t)$ of step height $\phi_s=\pi/40$ so as to introduce between the two counter-propagating waves 24, 25 a first feedback phase-difference modulation component $\Delta\phi_{cr1}(t)$ compensating for the phase difference $\Delta\phi_p$ due to the parameter to be measured.

For the third embodiment of the invention, it has hence been shown in FIG. 35:

the total phase difference $\Delta\phi_t(t)$ 3501 between the two counter-propagating waves 24, 25 at the output of the ring interferometer 20, this total phase difference $\Delta\phi_t(t)$ being such that: $\Delta\phi_t(t)=\Delta\phi_p+\Delta\phi_m(t)$, the luminous power $P(\Delta\phi_t)$ 3502 received by the detector 14 as a function of the total phase difference $\Delta\phi_t(t)$, and the modulated electrical signal $S(t)$ 3503 delivered by the detector 14 as a function of time $t$.

As the total phase difference $\Delta\phi_t(t)$ 3501 is the sum of the phase difference $\Delta\phi_p$ due to the parameter to be measured and of the phase-difference modulation $\Delta\phi_m(t)$ 3400, it will also be observed in FIG. 35 that the curve 3501 representing the total phase difference $\Delta\phi_t(t)$ as a function of time $t$ corresponds to the curve 3400 of FIG. 34 representing the phase-difference modulation $\Delta\phi_m(t)$, this curve being shifted towards the abscissa axis by the value of the phase difference $\Delta\phi_p$ due to the parameter to be measured.

Hence, the total phase-difference modulation $\Delta\phi_t(t)$ 3501 has sequentially four different levels defining four different modulations states, which are:

State E1 when the total phase-difference modulation $\Delta\phi_t(t)$ is $\Delta\phi_1=\pi-\pi/4=3\pi/4$, State E2 when the total phase-difference modulation $\Delta\phi_t(t)$ is $\Delta\phi_2=\pi+\pi/4=5\pi/4$, State E3 when the total phase-difference modulation $\Delta\phi_t(t)$ is $\Delta\phi_3=-\pi+\pi/4=-3\pi/4$ ($=\Delta\phi_2-2\pi$), State E4 when the total phase-difference modulation $\Delta\phi_t(t)$ is $\Delta\phi_4=-\pi-\pi/4=-5\pi/4$ ($=\Delta\phi_1-2\pi$).

The luminous power $P(\Delta\phi_t)$ 3502 received by the detector 14 is hence modulated according to the four distinct modulation states and the modulated electric signal $S(t)$ 3503 delivered by the detector 14 takes sequentially four values S1, S2, S3, and S4 associated with the four modulation states E1, E2, E3, and E4, respectively, of the total phase-difference modulation $\Delta\phi_t(t)$ 3501.

As can be seen in FIG. 28, the luminous power $P(\Delta\phi_t)$ 3502 received by the detector 14 in the four modulation states E1 to E4 is the same. Indeed, the received luminous power $P(\Delta\phi_t)$ 3502 being a cosine function of the total phase difference $\Delta\phi_t$ 3501, the following relations are satisfied: $P(\Delta\phi_1)=P(\Delta\phi_4)$ and $P(\Delta\phi_2)=P(\Delta\phi_3)$. Moreover, the states E1 and E2 (respectively the states E3 and E4) being symmetrical with respect to $\pi$ (respectively with respect to $-\pi$), the following relations are also satisfied: $P(\Delta\phi_1)=P(\Delta\phi_2)$ and $P(\Delta\phi_3)=P(\Delta\phi_4)$.

The detector 14 then delivers a modulated electric signal $S(t)$ 3503 as shown in FIG. 35. This modulated electric signal $S(t)$ 3503 takes sequentially the four values S1, S2, S3, and S4 associated with the four modulation states E1, E2, E3, and E4, respectively. Taking into account what have been explained regarding the luminous power $P(\Delta\phi_t)$ 3502 received by the detector 14 in the four modulation states E1 to E4, these four values S1, S2, S3, and S4 taken by the modulated electrical signal S(t) 3503 are herein all identical: S1=S2=S3=S4.

As herein-above, it can be observed that the falling down of the phase-difference modulation $\Delta\phi_m(t)$ 3400 at the instant $t=t_R$ (see FIG. 34) creates no defect in the modulated electrical signal S(t) 3503 of FIG. 35 insofar as the total phase difference $\Delta\phi_t$ 3501 does not change during this falling down ($\Delta\phi_m(t)$ remaining at its high level 3402). Hence, the falling down does not disturb the measurement.

4th Embodiment

A fourth embodiment of the invention will now be detailed with reference to FIGS. 36 to 40. In this embodiment:
- $a_1=1$ and $k_1=0$, i.e. the first biasing phase-shift modulation component $\phi_{b1}(t)$ is a square pulse-wave modulation of amplitude $\pi$ between a high level $+\pi/2$ and a low level $-\pi/2$ and periodic at a first biasing modulation frequency $f_{b1}$ equal to the proper frequency $f_p$ of the SAGNAC ring interferometer 20, and
- $\Delta\phi_p=-3\pi/40$ so that the first feedback phase-shift modulation component $\phi_{cr1}(t)$ is an ascending stair-step modulation of step height $\phi_{s1}=[a_2/(a_2-1)](-\Delta\phi_p)=\pi/10$ with $a_2=4\neq a_1=1$.

Hence, in this fourth embodiment of the invention, the first phase-shift modulation component $\phi_{m1}(t)$ 3600 is such as shown in FIG. 36. It has an ascending pulse-wave modulation shape, falls down by $2\pi$ at the instant $t=t_R$, and has a maximum amplitude lower than $2\pi$.

Moreover, in this fourth embodiment of the invention, the biasing means 120 generate a second biasing signal producing at the output of the modulation chain 30 a second biasing phase-shift modulation component $\phi_{b2}(t)$, this second biasing phase-shift modulation component $\phi_{b2}(t)$ being:
- a square pulse-wave modulation of amplitude $\pi/a_2=\pi/4$ (hence $a_2=4$, as described above) between a high level $+\pi/8$ and a low level $-\pi/8$,
- periodic at a second biasing modulation frequency $f_{b2}$ such that $f_{b2}=f_{b1}=(2k_1+1)f_p=f_p$, because herein $k_1=0$ (see above),
- in lagging quadrature relative to the first biasing phase-shift modulation component $\phi_{b1}(t)$.

It will be defined herein that the second biasing phase-shift modulation component $\phi_{b2}(t)$ is in lagging quadrature relative to the first biasing phase-shift modulation component $\phi_{b1}(t)$ when a transition of the first biasing phase-shift modulation component $\phi_{b1}(t)$ from a high level to a low level occurs when the second biasing phase-shift modulation component $\phi_{b2}(t)$ is at a high level. By symmetry, a transition of the first biasing phase-shift modulation component $\phi_{b1}(t)$ from a low level to a high level occurs when the second biasing phase-shift modulation component $\phi_{b2}(t)$ is at a low level.

In this fourth embodiment of the invention, the feedback means 120 generate a second feedback signal, producing at the output of the modulation chain a second feedback phase-shift modulation component $\phi_{cr2}(t)$ which is:
- a stair-step modulation, each step having a duration $\Delta\tau_g$ and a height $\phi_{s2}=[1/(a_2-1)](-\Delta\phi_p)=(1/3)\cdot(3\pi/40)=\pi/40$,
- in lagging quadrature relative to the first feedback phase-shift modulation component $\phi_{cr1}(t)$.

So generated, the second feedback phase-shift modulation component $\phi_{cr2}(t)$ introduces a second feedback phase-difference modulation component $\Delta\phi_{r2}(t)=\phi_{cr2}(t)-\phi_{cr2}(t-\Delta\tau_g)$ between the two counter-propagating waves 24, 25 propagating in the SAGNAC ring interferometer 20.

The heights $\phi_{s1}$ and $\phi_{s2}$ of the first and second feedback phase-shift modulation components $\phi_{cr1}(t)$ and $\phi_{cr2}(t)$ are such that the difference between the first feedback phase-difference modulation component $\Delta\phi_{cr1}(t)$ and the second feedback phase-difference modulation component $\Delta\phi_{cr2}(t)$ compensates for the phase difference $\Delta\phi_p$.

Indeed, the feedback phase-difference modulation $\Delta\phi_{cr}(t)$, defined as the difference between the first feedback phase-difference modulation component $\Delta\phi_{cr1}(t)$ and the second feedback phase-difference modulation component $\Delta\phi_2(t)$, is a stair-step modulation, each step having a height $\phi_s=\phi_{s1}-\phi_{s2}=\pi/10-\pi/40=3\pi/40=\Delta\phi_p$.

Besides, in this fourth embodiment, the control means 140 for controlling the modulation chain 30 process the second biasing signal and second feedback signal to deliver at least one second control signal at the input of the modulation chain 30.

This second control signal then produces at the output of the modulation chain 30 a second phase-shift modulation component $\phi_{m2}(t)$ which is the sum of the second biasing phase-shift modulation component $\phi_{b2}(t)$ and the second feedback phase-shift modulation component $\phi_{cr2}(t)$, so that: $\phi_{m2}(t)=\phi_{b2}(t)+\phi_{cr2}(t)$.

Furthermore, according to this fourth embodiment, the control means 140 are arranged so that the second phase-shift modulation component $\phi_{m2}(t)$ operates a transition of twice the amplitude of the second biasing phase-shift modulation component $\phi_{b2}(t)$, i.e. herein $2\pi/a_2=2\pi/4=\pi/2$ (with $a_2=4$), when its level exceeds the amplitude of the second biasing phase-shift modulation component $\phi_{b2}(t)$, i.e. $\pi/a_2=\pi/4$.

Hence, it has been shown in FIG. 37 the curve representing this second phase-shift modulation component $\phi_{m2}(t)$ 3700. Being formed similarly to the first phase-shift modulation component $\phi_{m1}(t)$ 3600, the second phase-shift modulation component $\phi_{m2}(t)$ 3700 is also a pulse-wave modulation, herein ascending. This modulation falls down at the instant $t=t'_R=t_R+\Delta\tau_g/2$, $\phi_{m2}(t)$ being in lagging quadrature relative to $\phi_{m1}(t)$.

Mathematically, the relation that links the first phase-shift modulation component $\phi_{m1}(t)$ 3600 to the second phase-shift modulation component $\phi_{cr2}(t)$ 3700 is herein the following: $\phi_{m2}(t)=(1/a_2)\cdot\phi_{m1}(t-\Delta\tau_g/2)$.

Generally, in this fourth embodiment, when:
- the first phase-shift modulation component $\phi_{m1}(t)$ is a pulse-wave modulation, the width of each pulse of which is equal to $\Delta\tau_g/(2k_1+1)$, the first biasing phase-shift modulation component $\phi_{b1}(t)$ being a periodic modulation at a first biasing modulation frequency $f_{b1}$ such that $f_{b1}=(2k_1+1)f_p$ ($f_p=1/2\Delta\tau_g$ being the proper frequency of the ring interferometer 20), and
- the second phase-shift modulation component $\phi_{m2}(t)$ is a pulse-wave modulation, the width of each pulse of which is equal to $\Delta\tau_g/(2k_1+1)$, the second biasing phase-shift modulation component $\phi_{b1}(t)$ being a periodic modulation at a second biasing modulation frequency $f_{b2}$ such that $f_{b2}=f_{b1}=(2k_1+1)f_p$, the mathematical relation that links the first phase-shift modulation component $\phi_{m1}(t)$ to the second phase-shift modulation component $\phi_{m2}(t)$ is then the following: $\phi_{m2}(t)=(1/a_2)\cdot\phi_{m1}(t-[\Delta\tau_g/2(2k_1+1)])$.

A phase-shift modulation $\phi_m(t)$ is then defined as the difference between the first phase-shift modulation component $\phi_{m1}(t)$ and the second phase-shift modulation component $\phi_{m2}(t)$ such that $\phi_m(t)=\phi_{m1}(t)-\phi_{m2}(t)$.

It has hence been shown in FIG. 38 the resulting phase-shift modulation $\phi_m(t)$ 3800 for this fourth embodiment.

It can be observed in this figure that the phase-shift modulation $\phi_m(t)$ 3800 is an ascending, "four state" modulation, having:

a falling down at the instant $t=t_R$ of the falling down of the first phase-shift modulation component $\phi_{m1}(t)$ 3600, this falling down having the same amplitude, i.e. $2\pi$, and a rising up at the instant $t=t'_R=t_R+\Delta\tau_g/2$ of the falling down of the second phase-shift modulation component $\phi_{m2}(t)$ 3700, this rising up having the same amplitude as the falling down, i.e. $2\pi/4$.

The phase-shift modulation $\phi_m(t)$ 3800 operates a rising up at the instant $t=t'_R$ rather than a falling down as the second phase-shift modulation component $\phi_{m2}(t)$ 3700 because the contribution of the second phase-shift modulation component $\phi_{m2}(t)$ 3700 is added negatively to the phase-shift modulation $\phi_m(t)$ 3800, being equal to $\phi_{m1}(t)-\phi_{m2}(t)$.

So formed, the phase-shift modulation $\phi_m(t)$ 3800 has a maximum amplitude strictly lower than $2\pi$, as can be verified in FIG. 38. The excursion of the modulation chain is hence limited and the effects of the non-linearities of the latter are reduced.

So generated by the phase modulator 33 of the modulation chain 30, the phase-shift modulation $\phi_m(t)$ 3800 introduces between the two counter-propagating waves 24, 25 at the output of the SAGNAC ring interferometer 20 a phase-difference modulation $\Delta\phi_m(t)=\phi_m(t)-\phi_m(t-\Delta\tau_g)$ such as shown in FIG. 39.

It is observed, for this fourth embodiment, that the phase-difference modulation $\Delta\phi_m(t)$ 3900 also oscillates between 4 different levels:

two high levels:
a first level when $\Delta\phi_m(t)=\pi-\pi/4+\phi_s$,
a second level when $\Delta\phi_m(t)=\pi+\pi/4+\phi_s$, and
two low levels:
a third level when $\Delta\phi_m(t)=-\pi+\pi/4+\phi_s$
a fourth level when $\Delta\phi_m(t)=-\pi-\pi/4+\phi_s$.

As can be seen in FIG. 39, the phase-difference modulation $\Delta\phi_m(t)$ 3900 is hence shifted towards the high side of the value $\phi_s=-\Delta\phi_p$ ($=3\pi/40$ herein) as seen above. Moreover, its amplitude is herein equal to $2\pi+2(\pi/4)=2\pi+\pi/2$.

Besides, it can be observed that at the instant $t=t_R$ of the falling down of the phase-shift modulation $\phi_m(t)$ 3800, the phase-difference modulation $\Delta\phi_m(t)$ 3900 does not rise up but remains at its third level 3901 during half a step duration $\Delta\tau_g/2$. Then, at the instant $t=t'_R=t_R+\Delta\tau_g/2$ of the falling down of the second phase-shift modulation component $\phi_{m2}(t)$, the phase-difference modulation $\Delta\phi_m(t)$ still remains at its third level 3902 during half a step duration $\Delta\tau_g/2$.

The phase-difference modulation $\Delta\phi_m(t)$ then rises up towards the levels to resume its alternations between high levels and low levels until the next transition.

For the fourth embodiment of the invention, it has finally been shown in FIG. 40:

the total phase difference $\Delta\phi_t(t)$ 4001 between the two counter-propagating waves 24, 25 at the output of the ring interferometer 20, this total phase difference $\Delta\phi_t(t)$ 4001 being such that: $\Delta\phi_t(t)=\Delta\phi_p+\Delta\phi_m(t)$, the luminous power $P(\Delta\phi_t)$ 4002 received by the detector 14 as a function of the total phase difference $\Delta\phi_t(t)$ 4001, and the modulated electric signal $S(t)$ 4003 delivered by the detector 14 as a function of time t.

As hereinabove, it can be observed that neither the falling down at the instant $t=t_R$, nor the rising up at the instant $t=t'_R$ of the phase-difference modulation $\Delta\phi_m(t)$ 3900 (see FIG. 39) creates a defect in the modulated electric signal $S(t)$ 4003 of FIG. 40, insofar as the total phase difference $\Delta\phi_t$ 4001 does not change during this falling down or this rising up ($\Delta\phi_m(t)$ remaining at its third level 3901 and 3902). Hence, neither the falling down, nor the rising up, disturbs the measurement.

The measurement device according to the invention is particularly well adapted to the realization of a gyrometer. In this case, the parameter to be measured is a component of the rotational speed of the ring interferometer.

This gyrometer hence advantageously enters into the making of navigation or inertial-stabilization systems.

Such an arrangement is also well adapted to the realization of a device for measuring magnetic fields or electric currents, using advantageously the FARADAY effect.

The invention claimed is:

1. A fibre-optic measurement device (10) in which a parameter to be measured generates a phase difference $\Delta\phi_p$ between two counter-propagating waves (24, 25), comprising:

a light source (11), a fiber-optic SAGNAC ring interferometer (20), including a coil (21) and a splitting element (23), in which said two counter-propagating waves (24, 25) propagate, said ring interferometer (20) having a proper frequency $f_p$, an electromagnetic radiation detector (14), receiving the luminous power exiting from said ring interferometer (20) and delivering a modulated electrical signal representative of the luminous power, which is function of the total phase difference $\Delta\phi_t$ between said two counter-propagating waves (24, 25) at the output of said ring interferometer (20), a modulation chain (30) adapted to modulate said luminous power exiting from said ring interferometer (20), said modulation chain (30) including at least one phase modulator (33) placed in said ring interferometer (20) and adapted to generate at the output of said modulation chain (30) a phase-shift modulation $\phi_m(t)$, introducing between said two counter-propagating waves a phase-difference modulation $\Delta\phi_m(t)$ such that: $\Delta\phi_m(t)=\phi_m(t)-\phi_m(t-\Delta\tau_g)$, $\Delta\tau_g=1/(2\,f_p)$ being the transit time difference between said two counter-propagating waves (24, 25) determined between said phase modulator (33) and said splitting element (23), and an electronic module (100) comprising:
 i) signal processing means (110) including: an analog/digital converter (111) digitizing said modulated electrical signal received from the detector (14) and representative of said luminous power received by said detector (14) to deliver a digital electrical signal, and a digital processing unit (112) adapted to process said digital electrical signal to deliver a signal function of said phase difference $\Delta\phi_p$ and of said parameter to be measured,
 ii) a biasing module (130) providing a first biasing signal, producing at the output of the modulation chain (30), a first, square pulse-wave, biasing phase-shift modulation component $\phi_{b1}(t)$ of amplitude $\pi/a_1$, $a_1$ being a non-zero real number, periodic at a first biasing modulation frequency $f_{b1}$ such that $f_{b1}=(2k_1+1)f_p$, $k_1$ being a natural number and $f_p$ being the proper frequency, iii) feedback means (120) adapted to process said signal function of said phase difference $\Delta\phi_p$ to generate a first feedback signal, producing at the output of the modulation chain (30), a first, stair-step, feedback phase-shift modulation component $\phi_{cr1}(t)$, each step having a duration $\Delta\tau_g/(2k_1+1)$, said first feedback phase-shift modulation component $\phi_{cr1}(t)$ introducing between said two counter-propagation waves (24, 25) a first feedback phase-difference modulation component $\Delta\phi_{cr1}(t)=\phi_{cr1}(t)-\phi_{cr1}(t-\Delta\tau_g)$ that is function of said phase difference $\Delta\phi_p$, and iv) a control module (140) for controlling said modulation chain (30), the control module (140) receiving said first biasing signal from the biasing module (130) and said first feedback signal from said feedback means (120), the control module (140) being adapted to process said first biasing signal and said first feedback signal to deliver at least one first control signal at the input of said modulation chain (30), the at least one first control signal producing at the output of the modulation chain (30) a first phase-shift modulation component $\phi_{m1}(t)$ that is the phase sum of said first biasing phase-shift modulation component $\phi_{b1}(t)$ and of said first feedback phase-shift modulation component $\phi_{cr1}(t)$, such that $\phi_{m1}(t)=\phi_{b1}(t)+\phi_{cr1}(t)$, wherein the control module (140) is arranged so that said first phase-shift modulation component $\phi_{m1}(t)$ operates a transition of twice the amplitude of the first biasing phase-shift modulation component $\phi_{b1}(t)$ when the level of said first phase-shift modulation component $\phi_{m1}(t)$ exceeds the amplitude of the first biasing phase-shift modulation component $\phi_{b1}(t)$.

2. The fibre-optic measurement device (10) according to claim 1, wherein said first feedback phase-shift modulation component $\phi_{cr1}(t)$ has stair steps of height $-\Delta\phi_p/(2k_1+1)$, such that said first feedback phase-difference modulation component $\Delta\phi_{cr1}(t)$ is such that $\Delta\phi_{cr1}(t)=-\Delta\phi_p$, to compensate for said phase difference $\Delta\phi_p$ due to the parameter to be measured.

3. The fibre-optic measurement device (10) according to claim 2, wherein said biasing module (130) is adapted to generate a second biasing signal, producing at the output of the modulation chain (30) a second component of biasing phase-shift modulation $\phi_{b2}(t)$, said second biasing phase-shift modulation component $\phi_{b2}(t)$ being:
 a square pulse-wave modulation of amplitude $\pi/a_2$, $a_2$ being a non-zero real number different from $a_1$,
 periodic at a second biasing modulation frequency $f_{b2}$ such that $f_{b2}=(2k_2+1)f_p$, $k_2$ being a natural number such that $(2k+1)$ and $(2k_2+1)$ are multiples of each other, and $f_p$ being the proper frequency,
 in quadrature relative to the first biasing phase-shift modulation component $\phi_{b1}(t)$.

4. The fibre-optic measurement device (10) according to claim 3, wherein $a_1=1$.

5. The fibre-optic measurement device (10) according to claim 4, also comprising a gain-control module (150) that controls the gain of said modulation chain (30) allowing to keep adjusted the transfer function of said modulation chain (30).

6. The fibre-optic measurement device (10) according to claim 3, wherein $a_2=1$.

7. The fibre-optic measurement device (10) according to claim 6, also comprising a gain-control module (150) that controls the gain of said modulation chain (30) allowing to keep adjusted the transfer function of said modulation chain (30).

8. The fibre-optic measurement device (10) according to claim 3, also comprising a gain-control module (150) that controls the gain of said modulation chain (30) to keep adjusted the transfer function of said modulation chain (30).

9. The fibre-optic measurement device (10) according to claim 3, wherein $k_2=0$.

10. The fibre-optic measurement device (10) according to claim 1, wherein,
 $a_1=1$,
 said first feedback phase-shift modulation component $\phi_{cr1}(t)$ has stair steps of height $[a_2/(a_2-1)][-\Delta\phi_p/(2k_1+1)]$, $a_2$ being a real number strictly higher than $a_1=1$,
 said biasing module (130) is adapted to generate a second biasing signal producing at the output of the modulation chain (30) a second biasing phase-shift modulation component $\phi_{b2}(t)$, said second biasing phase-shift modulation component $\phi_{b2}(t)$ being:
 a square pulse-wave modulation of amplitude $\pi/a_2$,
 periodic at a second biasing modulation frequency $f_{b2}$ such that $f_{b2}=f_{b1}=(2k_1+1)f_p$, $f_{b1}$ being the first biasing modulation frequency and $f_p$ being the proper frequency, and
 in lagging quadrature relative to the first biasing phase-shift modulation component $\phi_{b1}(t)$,
 said feedback means (120) are adapted to generate a second feedback signal, producing at the output of the modulation chain a second feedback phase-shift modulation component $\phi_{cr2}(t)$, said second feedback phase-shift modulation component $\phi_{cr2}(t)$ being:
 a stair-step modulation, each step having a duration $\Delta\tau_g/(2k_1+1)$, and a height $[1/(a_2-1)][-\Delta\phi_p/(2k_1+1)]$,
 in lagging quadrature relative to the first feedback phase-shift modulation component $\phi_{cr1}(t)$, and
 said second feedback phase-shift modulation component $\phi_{cr2}(t)$ introducing a second feedback phase-difference modulation component $\Delta\phi_{cr2}(t)=\phi_{cr2}(t)-\phi_{cr2}(t-\Delta\tau_g)$ between said two counter-propagating waves (24, 25), such that the difference between the first feedback phase-difference modulation component $\Delta\phi_{cr1}(t)$ and the second feedback phase-difference modulation component $\Delta\phi_{cr2}(t)$ compensates for the phase difference $\Delta\phi_p$
 said control module (140) is adapted to process said second biasing signal and said second feedback signal to deliver at least one second control signal at the input of said modulation chain (30), producing at the output of the modulation chain (30) a second phase-shift modulation component $\phi_{m2}(t)$ that is the sum of said second biasing phase-shift modulation component $\phi_{b2}(t)$ and said second feedback phase-shift modulation component $\Delta\phi_{cr2}(t)$, so that $\phi_{m2}(t)=\phi_{b2}(t)+\phi_{cr2}(t)$, and
 the control module (140) is arranged so that said second phase-shift modulation component $\phi_{m2}(t)$ operates a transition of twice the amplitude of the second biasing phase-shift modulation component $\phi_{b2}(t)$ when its level exceeds the amplitude of the second biasing phase-shift modulation component $\phi_{b2}(t)$, the phase-shift modulation $\phi_m(t)$ being equal to the difference between the first phase-shift modulation component $\phi_{m1}(t)$ and the second phase-shift modulation component $\phi_{m2}(t)$, so that $\phi_m(t)=\phi_{m1}(t)-\phi_{m2}(t)$.

11. The fibre-optic measurement device (10) according to claim 1, wherein $k_1=0$.

12. The fiber-optical measurement device (10) according to claim 1, wherein said fiber-optic measurement device is a gyrometer, the parameter to be measured being a component of the rotational speed of the ring interferometer (20).

* * * * *